(12) United States Patent
Matsumoto et al.

(10) Patent No.: US 12,034,120 B2
(45) Date of Patent: Jul. 9, 2024

(54) ELECTROLYTIC SOLUTION AND ELECTROCHEMICAL DEVICE

(71) Applicant: MURATA MANUFACTURING CO., LTD., Kyoto (JP)

(72) Inventors: Ryuhei Matsumoto, Kyoto (JP); Yuri Nakayama, Kyoto (JP); Hideki Kawasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 795 days.

(21) Appl. No.: 17/164,139

(22) Filed: Feb. 1, 2021

(65) Prior Publication Data

US 2021/0159542 A1 May 27, 2021

Related U.S. Application Data

(63) Continuation of application No. PCT/JP2019/030620, filed on Jul. 30, 2019.

(30) Foreign Application Priority Data

Aug. 1, 2018 (JP) ................................. 2018-145250

(51) Int. Cl.
*H01M 10/0568* (2010.01)
*H01G 9/035* (2006.01)
(Continued)

(52) U.S. Cl.
CPC ........ *H01M 10/0568* (2013.01); *H01G 9/035* (2013.01); *H01G 9/042* (2013.01);
(Continued)

(58) Field of Classification Search
CPC ......... H01M 10/0567; H01M 10/0568; H01M 10/0569; H01M 10/054; H01M 4/466;
(Continued)

(56) References Cited

U.S. PATENT DOCUMENTS

| | | | |
|---|---|---|---|
| 2013/0252112 A1* | 9/2013 | Doe .................. | H01M 10/0568 429/328 |
| 2018/0062176 A1 | 3/2018 | Liao et al. | |

(Continued)

FOREIGN PATENT DOCUMENTS

| | | |
|---|---|---|
| JP | 2014232719 A | 12/2014 |
| WO | 2017/217685 | 12/2017 |

OTHER PUBLICATIONS

Chinese Office Action issued Oct. 28, 2023 in corresponding Chinese Application No. 201980051201.5.

(Continued)

*Primary Examiner* — Christopher P Domone
(74) *Attorney, Agent, or Firm* — K&L Gates LLP

(57) ABSTRACT

An electrolytic solution for an electrochemical device including a magnesium electrode as a negative electrode is provided. The electrolytic solution includes a linear ether solvent. The linear ether solvent includes a first magnesium salt having a disilazide structure represented by a general formula $(R_3Si)_2N$ where R represents a hydrocarbon radical with one or more and ten or less carbon atoms and a second magnesium salt without the disilazide structure.

16 Claims, 14 Drawing Sheets

(51) Int. Cl.
- *H01G 9/042* (2006.01)
- *H01G 9/145* (2006.01)
- *H01M 4/46* (2006.01)
- *H01M 10/0569* (2010.01)
- *H01M 4/02* (2006.01)

(52) U.S. Cl.
CPC ............ *H01G 9/145* (2013.01); *H01M 4/466* (2013.01); *H01M 10/0569* (2013.01); *H01M 2004/027* (2013.01); *H01M 2300/002* (2013.01); *H01M 2300/0028* (2013.01)

(58) Field of Classification Search
CPC ... H01M 2300/002; H01M 2300/0025; H01M 2300/0028; H01G 9/035; H01G 9/042; H01G 9/145
See application file for complete search history.

(56) References Cited

U.S. PATENT DOCUMENTS

2018/0138552 A1* 5/2018 Matsumoto ......... H01M 10/054
2018/0233784 A1 8/2018 Zhamu et al.

OTHER PUBLICATIONS

Japanese Office Action issued Oct. 12, 2021 in corresponding Japanese Application No. 2020-534788.
International Search Report for Application No. PCT/JP2019/030620, dated Oct. 15, 2019.
Zhao-Karger et al., "Performance Improvement of Magnesium Sulfur Batteries with Modified Non-Nucleophilic Electrolytes", Advanced Energy Materials, vol. 5, No. 3, pp. 1401155 (1-9), Feb. 5, 2015.
Liao et al., "The unexpected discovery of the Mg(HMDS)2/MgCl2 complex as a magnesium electrolyte for rechargeable magnesium batteries", Journal of Materials Chemistry A, vol. 3, No. 11, pp. 6082-6087, Feb. 2, 2015.
Merrill et al., "Electrochemical Properties and Speciation in Mg(HMDS)2-Based Electrolytes for Magnesium Batteries as a Function of Ethereal Solvent Type and Temperature", Langmuir, vol. 33, No. 37, pp. 9426-9433, Jun. 21, 2017.
Gao et al., "Reversible S0/MgSx Redox Chemistry in MgTFSI2-MgCl2 Electrolyte for Rechargeable Mg/S Battery", Angewandte Chemie International Edition, 10.1002/anie.201708241, 2017.

* cited by examiner

ELECTROLYTIC SOLUTION AND ELECTROCHEMICAL DEVICE

CROSS REFERENCE TO RELATED APPLICATIONS

The present application is a continuation of PCT patent application no. PCT/JP2019/030620, filed on Jul. 30, 2019, which claims priority to Japanese patent application no. JP2018-1.45250 filed on Aug. 1, 2018, the entire contents of which are being incorporated herein by reference.

BACKGROUND

The present technology generally relates to an electrolytic solution and an electrochemical device.

Electrochemical devices include capacitors, air batteries, fuel cells, secondary batteries, and the like, and are used for various purposes. The electrochemical device includes a positive electrode and a negative electrode, and has an electrolytic solution responsible for ion transport between the positive electrode and the negative electrode.

For example, as the electrode of the electrochemical device expressed by magnesium batteries, an electrode made of magnesium or an electrode including at least magnesium is provided (in the following, such an electrode is simply referred to as "a magnesium electrode" and an electrochemical device using a magnesium electrode is also referred to as "a magnesium electrode-based electrochemical device"). Magnesium is resource-rich and much cheaper than lithium. Magnesium generally has a large amount of electricity per unit volume that can be extracted by a redox reaction, and is highly safe when used in an electrochemical device. Therefore, magnesium batteries are attracting attention as next-generation secondary batteries to replace lithium-ion batteries.

SUMMARY

The present technology generally relates to an electrolytic solution and an electrochemical device.

It is proposed to use a magnesium salt and an ether-based organic solvent for dissolving the magnesium salt as the electrolytic solution of the magnesium battery.

In a magnesium electrode-based electrochemical device in which an electrolytic solution containing such an ether-based organic solvent is used, an efficient negative electrode is requested. More specifically, the negative electrode is requested to exhibit higher coulombic efficiency. This is because magnesium is used more efficiently in charge and discharge cycles and a desired electrochemical device can be realized.

The present technology is made in view of such circumstances. That is, a main object of the present technology is to provide an electrolytic solution that contributes to the realization of an electrochemical device having a negative electrode with higher coulombic efficiency.

The above-described problems have been attempted to be solved by addressing in a new direction, instead of dealing with the extension of conventional technologies. As a result, the technology of an electrolytic solution that achieves the main purpose is reached.

According to an embodiment of the present technology, an electrolytic solution is provided. The electrolytic solution for an electrochemical device including a magnesium electrode as a negative electrode includes a solvent including a linear ether, in which the solvent includes a first magnesium salt having a disilazide structure represented by a general formula $(R_3Si)_2N$ (in the formula, R represents a hydrocarbon radical with one or more and ten or less carbon atoms) and a second magnesium salt without the disilazide structure.

In the electrolytic solution of the present technology, an electrochemical device is provided, in which a negative electrode exhibits a higher coulombic efficiency. That is, in a magnesium electrode-based electrochemical device using the electrolytic solution of the present technology, a magnesium salt having a disilazide structure and a magnesium salt without such a structure coexist in a linear ether solvent, and however, the coulombic efficiency of the negative electrode (more specifically, the coulombic efficiency of precipitation dissolution of the negative electrode) is further improved due to such coexistence.

From such a viewpoint, in the magnesium electrode-based electrochemical device using the electrolytic solution of the present technology, the magnesium electrode is more efficiently used in charge and discharge cycles. More efficient use of the magnesium electrode for charging and discharging the electrochemical device means that magnesium, which is a surplus for the electrochemical device, is substantially unnecessary, That is, the amount of magnesium that is initially loaded is small, and a reduction in the size of the electrochemical device is easily achieved.

The electrolytic solution of the present technology can improve the coulombic efficiency of the negative electrode, i.e., the charge and discharge efficiency of the negative electrode while being an electrolytic solution that can improve the cycle characteristics of the positive electrode. More specifically, in the electrolytic solution of the present technology, the first magnesium salt having a disilazide structure coexists in a linear ether-based solvent containing another second magnesium salt with no disilazide structure. Since containing such a second magnesium salt in the linear ether solvent itself enables the improvement of the cycle characteristics of the magnesium electrode-based electrochemical device, further containing the first magnesium salt having a disilazide structure enables the improvement of the charging and discharging efficiency of the negative electrode as well. That is, the electrolytic solution in which "the first magnesium salt having a disilazide structure" is added to "another second magnesium salt having disilazide structure" enables the improvement of the coulombic efficiency of the negative electrode while maintaining preferred cycle characteristics of the positive electrode.

It should be understood that the effects described in the present specification are only examples, which do not impose limitations, and additional effects may be further provided.

DETAILED DESCRIPTION

Figure 1:
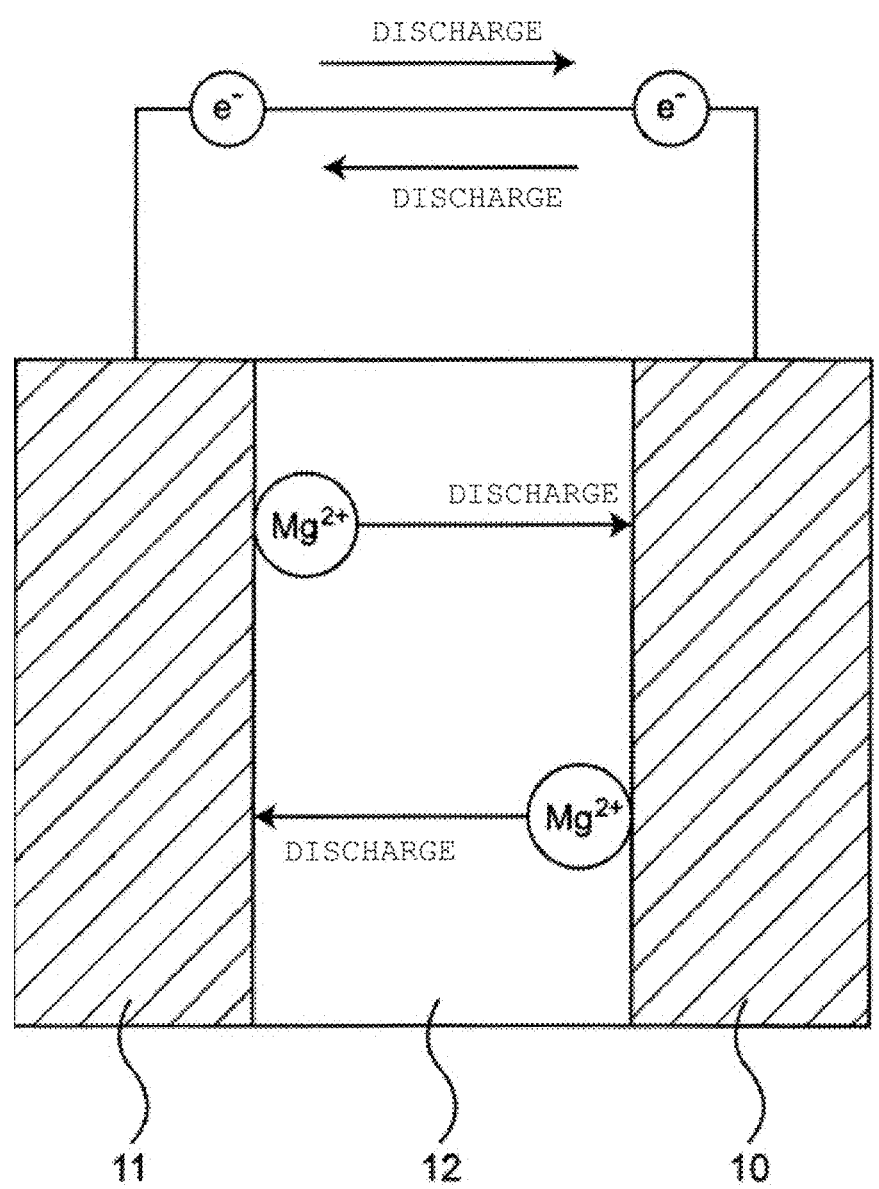
FIG. 1 is a conceptual diagram of a magnesium electrode-based electrochemical device (particularly a battery) according to an embodiment of the present technology.

In the following, an "electrolytic solution for an electrochemical device" and an "electrochemical device" of the present technology will be described in detail. Although the description will be given with reference to the drawings as necessary, contents shown are merely schematic and exemplary for the understanding of the present technology, and the appearance, dimensional ratio, and the like may differ from actual products. It should be noted that the various numerical ranges referred to her are intended to include the lower and upper limits themselves. In other words, taking a numerical range of one to ten as an example, it is interpreted as including the lower limit value "1" and the upper limit value "10" unless otherwise specified.

In the present technology, the term "electrochemical device" broadly means a device capable of extracting energy by utilizing electrochemical reactions. In a narrow sense, the term "electrochemical device" means a device that includes a pair of electrodes and electrolytic solutions, and more specifically means a device that is charged and discharged as ions move. Although only an example, examples of the electrochemical device include a capacitor, an air battery, a fuel cell, and the like, in addition to a secondary battery.

The electrolytic solution of the present technology is used for an electrochemical device. That is, the electrolytic solution described in the present specification correspond to an electrolytic solution for devices that can utilize an electrochemical reaction to extract energy.

The electrolytic solution of the present technology is, as a major premise, an electrolytic solution used in an electrochemical device including a magnesium electrode. More specifically, the electrolytic solution of the present technology is an electrolytic solution for an electrochemical device including a magnesium electrode as a negative electrode.

Therefore, the electrolytic solution of the present technology can be said to be an electrolytic solution for a magnesium electrode-based electrochemical device (in the following, also simply referred to as a "magnesium electrode-based electrolytic solution").

As will be described later, preferably, the negative electrode of such an electrochemical device is a magnesium electrode, while the positive electrode is a sulfur electrode. That is, in a preferred embodiment, the electrolytic solution of the present technology is an electrolytic solution for a magnesium (Mg)-sulfur (S) electrode.

Here, the term "magnesium electrode" used in the present specification broadly refers to an electrode having magnesium (Mg) as an active ingredient (that is, an active material). In a narrow sense, the term "magnesium electrode" refers to an electrode containing magnesium, for example, an electrode containing a magnesium metal or a magnesium alloy, particularly a negative electrode of such magnesium. Although the magnesium electrode may contain a component other than a magnesium metal or magnesium alloy, in a preferred embodiment, the magnesium electrode is an electrode made of a metal body of magnesium (for example, an electrode made of a single magnesium metal having a purity of 90% or more, preferably a purity of 95% or more, more preferably, a purity of 98% or more).

The term "sulfur electrode" used in the present specification broadly refers to an electrode having sulfur (S) as an active ingredient (that is, an active material). In a narrow sense, the term "sulfur electrode" refers to an electrode that contains at least sulfur, to an electrode that contains sulfur (S), such as $S_8$ and/or polymeric sulfur, and especially to a positive electrode of such sulfur. The sulfur electrode may contain a component other than sulfur, and may contain, for example, a conductive auxiliary agent and a binder. Although it is merely an example, a sulfur content in the sulfur electrode may be 5% by mass or more and 95% by mass or less based on the entire electrode, and may be, for example, about 70% by mass or more and about 90% by mass or less (in an exemplary embodiment, the sulfur content in the sulfur electrode may be 5% to 20% by weight or 5% to 15% by weight, for example).

A magnesium electrode-based electrolytic solution according to the present technology includes at least a solvent and a magnesium salt. More specifically, an electrolytic solution contains a magnesium salt and an ether solvent for dissolving the salt.

A solvent is preferably a linear ether among ether solvents. That is, preferably, an ether having a molecule in a linear structure forms the electrolytic solution solvent of a magnesium electrode system, not a cyclic ether such as tetrahydrofuran. In short, a solvent in an electrolytic solution of a magnesium electrode system according to the present technology is preferably a linear ether solvent.

In the magnesium electrode-based electrolytic solution according to the present technology, preferably, a linear ether as a solvent is a linear ether expressed by the following general formula.

[Chemical Formula 1]

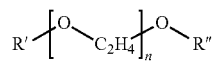

In the formula, R' and R" are each independently a hydrocarbon group having one or more and ten or less carbon atoms, and n is an integer of one or more and ten or less.

As can be seen from the general formula, the solvent used in the magnesium electrode-based electrolytic solution according to the present technology is preferably a linear ether having one or more ethyleneoxy structural units. The term "ethylene oxy structural unit" here refers to a molecular structural unit ($-O-C_2H_4-$) in which an ethylene group and an oxygen atom are bonded, and one or more such molecular structural units are included in the electrolytic solution solvent.

R' and R" in the general formula of the linear ether independently represent a hydrocarbon group. Therefore, R' and R" may independently be an aliphatic hydrocarbon group, an aromatic hydrocarbon group, and/or an aromatic aliphatic hydrocarbon group. Here, the tem "linear ether" as used in the present technology means that at least the site of the ethyleneoxy structural unit is not branched (that is, it does not have a branched structure). Therefore, R' and R" in the general formula do not necessarily have to have a linear structure, and may have a branched structure. In a preferred embodiment, the linear ether used in the magnesium electrode-based electrolytic solution according to the present technology is a glycol-based ether in which the site of the ethyleneoxy structural unit has no branched structure and R' and R" have no branched structure as well.

Although only one example, specific examples of such linear ethers include ethylene glycol dimethyl ether (dimethoxyethane), diethylene glycol dimethyl ether, triethylene glycol dimethyl ether, tetraethylene glycol dimethyl ether, pentaethylene glycol dimethyl ether, and hexaethylene glycol dimethyl ether, and polyethylene glycol dimethyl ether.

In a preferred embodiment of the linear ether in the present technology, a hydrocarbon group having one or more and ten or less carbon atoms is an aliphatic hydrocarbon group. That is, for the linear ether contained in the magnesium electrode-based electrolytic solution according to the present technology, R' and R" in the general formula may be independently an aliphatic hydrocarbon group having one or more and ten or less carbon atoms. Although not particularly limited, for ethylene glycol-based ethers, for example, linear ethers having an aliphatic hydrocarbon group having one or more and eight or less carbon atoms as R' and R" are exemplified as below.

Ethylene glycol dimethyl ether, ethylene glycol ethyl methyl ether, ethylene glycol methyl propyl ether, ethylene glycol butyl methyl ether, ethylene glycol methyl pentyl ether, ethylene glycol methyl hexyl ether, ethylene glycol methyl heptyl ether, and ethylene glycol methyl octyl ether;

ethylene glycol diethyl ether, ethylene glycol ethylpropyl ether, ethylene glycol butyl ethyl ether, ethylene glycol ethylpentyl ether, ethylene glycol ethylhexyl ether, ethylene glycol ethyl heptyl ether, and ethylene glycol ethyl octyl ether;

ethylene glycol dipropyl ether, ethylene glycol butyl propyl ether, ethylene glycol propyl pentyl ether, ethylene glycol propyl hexyl ether, ethylene glycol propyl heptyl ether, and ethylene glycol propyl octyl ether;

ethylene glycol dibutyl ether, ethylene glycol butyl pentyl ether, ethylene glycol butyl hexyl ether, ethylene glycol butyl heptyl ether, and ethylene glycol butyl octyl ether;

ethylene glycol dipentyl ether, ethylene glycol hexylpentyl ether, ethylene glycol heptylpentyl ether, and ethylene glycol octylpentyl ther;

ethylene glycol dihexyl ether, ethylene glycol heptylhexyl ether, and ethylene glycol hexyloctyl ether;

ethylene glycol diheptyl ether, and ethylene glycol heptyl octyl ether; and ethylene glycol dioctyl ether.

In the magnesium electrode-based electrolytic solution according to the present technology, the linear ether as described above coexists with a magnesium salt More specifically, in the present technology, the linear ether solvent includes a first magnesium salt having a disilazide structure expressed by a general formula $(R_3Si)_2N$ (in the formula, R is a hydrocarbon radical with one or more and ten or less carbon atoms, Si is a silicon atom, and N is a nitrogen atom) and includes a second magnesium salt that does not have the disilazide structure. In other words, the linear ether solvent does not simply include magnesium salts in a linear ether, and these magnesium salts are two unique species from the point of "disilazide".

The first magnesium salt corresponding to one of the metal salts contained in the linear ether solvent is a metal salt having a disilazide structure (in the formula, R is a hydrocarbon group having one or more and ten or less carbon atoms). The second magnesium salt, which is the other metal salt contained in the linear ether solvent, is a metal salt that does not have such a disilazide structure. At least two kinds of magnesium salts composed of one having a "disilazide structure" and one having no "disilazide structure" are included in the linear ether, and thus the coulombic efficiency of the negative electrode is further improved in the magnesium electrode-based electrochemical device. That is, assuming a secondary battery, using an electrolytic solution composed of a linear ether solvent containing the first magnesium salt and the second magnesium salt, a magnesium secondary battery having more improved charge and discharge efficiency can be achieved.

The second magnesium salt itself, which is a metal salt having no disilazide structure, may be a salt having a general formula $MgX_n$ (where n is one or two and X is a monovalent or divalent anion), In the case in which X is a halogen (F, Cl, Br, I), such a magnesium salt forms a halogen metal salt. X may be another anion. For example, the second magnesium salt may be at least one kind of magnesium salt selected from a group consisting of magnesium perchlorate ($Mg(ClO_4)_2$), magnesium nitrate ($Mg(NO_3)_2$), magnesium sulfate ($MgSO_4$), magnesium acetate ($Mg(CH_3COO)_2$), magnesium trifluoroacetate ($Mg(CF_3COO)_2$), magnesium tetrafluoroborate ($Mg(BF_4)_2$), magnesium tetraphenylborate ($Mg(B(C_6H_5)_4)_2$), magnesium hexatluorophosphate ($Mg(PF_6)_2$), magnesium hexafluoroarsenate ($Mg(AsF_6)_2$), and magnesium perfluoroalkyl sulfonate ($Mg(R_{f1}SO_3)_2$), where $R_{f1}$ is a perfluoroalkyl group), and magnesium perfluoroalkyl sulfonyl imide ($Mg((R_{f2}SO_2)_2N)_2$, where $R_{f2}$ is a perfluoroalkyl group).

In the present technology, the second magnesium salt is preferably composed of at least two kinds, not one kind. That is, preferably, the magnesium salt combined with the "first magnesium salt having a disilazide structure" is two or more kinds of magnesium salts. In a magnesium electrode-based electrolytic solution of a preferred embodiment, the linear ether solvent has an ethyleneoxy structural unit and has at least two kinds of "non-disiradide" second magnesium salts, which are contained together with a "disilazide" first magnesium salt, and thus the improvement of the coulombic efficiency of the negative electrode can be preferably expected. In a preferred embodiment, the improvement of the coulombic efficiency as well as desired cycle characteristics for the positive electrode can be expected.

The two types of second magnesium salts are preferably halogen-based and imide-based magnesium salts. That is, in the case in which the second magnesium salt combined with "the first magnesium salt having a di silazide structure" is composed of at least two kinds of magnesium salts, these two kinds of magnesium salts are preferably a halogen metal salt and an imide metal salt. This means that in the magnesium electrode-based electrolytic solution according to the present technology, the linear ether is preferably in a state in which "the first magnesium salt having a disilazide structure" is dissolved and in a state in which a halogen metal salt and an imide metal salt are dissolved.

Examples of the halogen metal salt include at least one kind selected from a group consisting of magnesium fluoride ($MgF_2$), magnesium chloride ($MgCl_2$), magnesium bromide ($MgBr_2$), and magnesium iodide ($MgI_2$). Among them, magnesium chloride is preferably used as a halogen metal salt. That is, preferably, one of at least two metal salts combined with the "disilazide" first magnesium salt to the linear ether solvent is magnesium chloride ($MgCl_2$). This is because the improvement of the coulombic efficiency of the negative electrode can be preferably expected in the electrochemical device including the magnesium electrode together with the imide salt, and in a more preferred embodiment, the improvement of the coulombic efficiency as well as desired cycle characteristics for the positive electrode can be expected.

The imide metal salt is a magnesium salt having an imide as a molecular structure. Preferably, the imide metal salt is a magnesium salt having a sulfonyl imide as its molecular structure. This is because the improvement of the coulombic efficiency of the negative electrode can be preferably expected in the magnesium electrode-based electrochemical device together with the halogen metal salt (e.g. magnesium chloride), and in a more preferred embodiment, the improvement of the coulombic efficiency as well as desired cycle characteristics for the positive electrode can be expected.

In a preferred embodiment, the imide metal salt is a magnesium salt of perfluoroalkyl sulfonyl imide. That is, preferably, the imide metal salt is $Mg((R_fSO_2)_2N)_2$ in the formula, $R_f$: perfluoroalkyl group). For example, $R_f$ may be a perfluoroalkyl group having one or more and ten or less carbon atoms, a perfluoroalkyl group having one or more and eight or less carbon atoms, a perfluoroalkyl group having one or more and six or less carbon atoms, a perfluoroalkyl group having one or more and four or less carbon atoms, a perfluoroalkyl group having one or more and three or less carbon atoms, or a perfluoroalkyl group having one to two carbon atoms. As an example, the imide metal salt may be magnesium bis(trifluoromethanesulfonyl) imide, i.e., $Mg(TFSI)_2$. This is because with such $Mg(TFSI)_2$, the improvement of the coulombic efficiency of the negative electrode can be preferably expected in the magnesium electrode-based electrochemical device together with the halogen metal salt (more particularly magnesium chloride ($MgCl_2$), and in a more preferred embodiment, the improvement of the coulombic efficiency as well as preferred cycle characteristics of the positive electrode can be expected.

The first magnesium salt corresponding to one of the metal salts contained in the linear ether solvent is a metal salt having a disilazide structure. Hydrocarbon groups in the disilazide structure may be aliphatic hydrocarbon groups, aromatic hydrocarbon groups, and/or aromatic aliphatic hydrocarbon groups. That is, in the first magnesium salt having a disilazide structure expressed by a general formula $(R_3Si)_2N$, R is composed of a hydrocarbon having one or more and ten or less carbon atoms, and may be an aliphatic hydrocarbon group having such a carbon number, an aromatic hydrocarbon group, and/or an aromatic aliphatic hydrocarbon group.

In a preferred embodiment, the R in the disilazide structure of the first magnesium salt is an aliphatic hydrocarbon group having one or more and ten or less carbon atoms. Such an aliphatic hydrocarbon group may be composed of a saturated hydrocarbon or may be composed of an unsaturated hydrocarbon.

For example, the aliphatic hydrocarbon group may be an alkyl group. In this case, in view of the disilazide structure of $(R_3Si)_2N$, it can be said that the first magnesium salt in the present technology preferably has a trialkylsilyl group. Such a first magnesium salt is combined with the halogen metal salt and the imide metal salt as described above, and thus the improvement of charge and discharge coulombic efficiency of the electrochemical device is more easily exerted.

In a preferred embodiment, the hydrocarbon group in the disilazide structure of the first magnesium is a lower alkyl group and is therefore, for example, a lower alkyl group having one or more and four or less carbon atoms. That is, in the first magnesium salt having a disilazide structure expressed by the general formula $(R_3Si)_2N$, R is a hydrocarbon group, and more specifically, and R may be an alkyl group having one or more and four or less carbon atoms. Taking the case in which the hydrocarbon group of R is a saturated hydrocarbon group as an example, R in the first magnesium salt having a disilazide structure expressed by $(R_3Si)_2N$ may be a methyl group, an ethyl group, an n-propyl group, an isopropyl group, a sec-butyl group, and/or a tert-butyl group, for example.

One preferred form of the first magnesium salt is one having a methyl group. For example, the first magnesium salt used in the electrolytic solution of the present technology is magnesium bis(hexamethyldisilazide), i.e., $Mg(HMDS)_2$. With the use of such a first magnesium salt, the improvement of charge and discharge coulombic efficiency of the electrochemical device is easily exerted. Particularly, such magnesium bis(hexa.methyldisilazide) is combined with the halogen metal salt and the imide metal salt, and thus the improvement of coulombic efficiency of the electrochemical device (particularly a magnesium battery, more preferably, a magnesium-sulfur battery) is more easily exerted.

In a preferred embodiment, the molar ratio of the first magnesium salt to the second magnesium salt is 0.01 or more. The molar ratio of "the first magnesium salt to the second magnesium salt" here means a value corresponding to "$N_{first\ MG\ salt}/N_{second\ Mg\ salt}$" where the amount of substance of the first magnesium salt is "$N_{first\ Mg\ salt}$" and the amount of substance of the second magnesium salt is "$N_{second\ Mg\ salt}$". In the case in which the second magnesium salt is composed of at least two kinds of salts, the sum total of the amounts of substance of these salts corresponds to "the amount of substance of the second magnesium salt". In the magnesium electrode-based electrolytic solution according to such a preferred embodiment, the amount of substance of the first magnesium salt contained in the linear ether solvent is the amount of substance of the second magnesium salt or less. In other words, in the magnesium electrode-based electrolytic solution according to the present technology, the content of the first magnesium salt having the disilazide structure expressed by $(R_3Si)_2N$ is by no means high, and the content may be the amount of substance or less of the other magnesium salt (i.e., the second magnesium salt) at maximum (e.g. a half or less of the amount of substance of the other magnesium salt). In the case in which the second magnesium salt is composed of at least two kinds of salts, the amount of substance of the first magnesium salt may be the amounts of substance of these salts or less or may be the sum total of these salts. Even the first magnesium salt having such a content contributes to the improvement of coulombic efficiency of the negative electrode in the magnesium electrode-based electrochemical device.

In a more specific aspect, in the magnesium electrode-based electrolytic solution according to the present technology, the molar ratio of the first magnesium salt to the second magnesium salt may be in the range of 0.01 or more and 1 or less. As described above, the magnesium electrode-based electrolytic solution according to the present technology may contain a small amount or a very small amount of the first magnesium salt contained in the linear ether-based solvent, and even such an amount can improve the coulombic efficiency in the electrochemical device.

In the case in which the imide metal salt is contained as the second magnesium salt, the first magnesium salt in the amount of substance or less of the imide metal salt may be contained in the linear ether solvent. This can be said particularly in the case in which the second magnesium salt is at least composed of two kinds of salts, the imide metal salt and the halogen metal salt. That is, in the case in which the "non-disilazide" second magnesium salt combined with the "disilazide" first magnesium salt is the imide metal salt and the halogen metal salt, the molar ratio of the first magnesium salt to the imide metal salt may be 0.01 or more (e.g. the molar ratio may be 0.01 or more and one or less). In a more specific embodiment, in the case in which the "non-disilazide" second magnesium salt combined with the "disilazide" first magnesium salt is the imide metal salt (e.g. a magnesium salt of perfluoroalkyl sulfonyl imide represented by $Mg(TFSI)_2$) and the halogen metal salt (e.g. $MgCl_2$), the molar ratio of the first magnesium salt to the imide metal salt may be in the range of 0.01 or more 0.5 or less, in the range of 0.01 or more 0.2 or less, and in the range of 0.01 or more 0.15 or less. Furthermore, such a molar ratio of the first magnesium salt to the imide metal salt may be may be in the range of 0.01 or more and 0.1 or less or in the range of 0.01 or more 0.05 or less, for example. As described above, even the amount of the "disilazide" first magnesium salt combined with the imide metal salt is smaller or much smaller than the amount of the imide metal salt, the coulombic efficiency of the negative electrode is improved in the magnesium electrode-based electrochemical device.

In the magnesium electrode-based electrolytic solution according to the present technology, the linear ether used as the solvent for the first magnesium salt and the second magnesium salt may be an ether having a single ethyleneoxy structural unit. That is, n in the Chemical formula 1 may be one, and thus may be an ethylene glycol-based ether. In the linear ether, R' and R" of the Chemical formula 1 may have the same alkyl group as each other. Examples of the linear ether include ethylene glycol dimethyl ether and/or ethylene glycol diethyl ether. In the case of such a linear ether, the second magnesium salt contains, for example, a halogen metal salt and an imide metal salt, the halogen metal salt is magnesium chloride, and the imide metal salt is a magnesium salt of perfluoroalkyl sulfonyl imide and the like (e.g. $Mg(TFSI)_2$).

Figure 11:
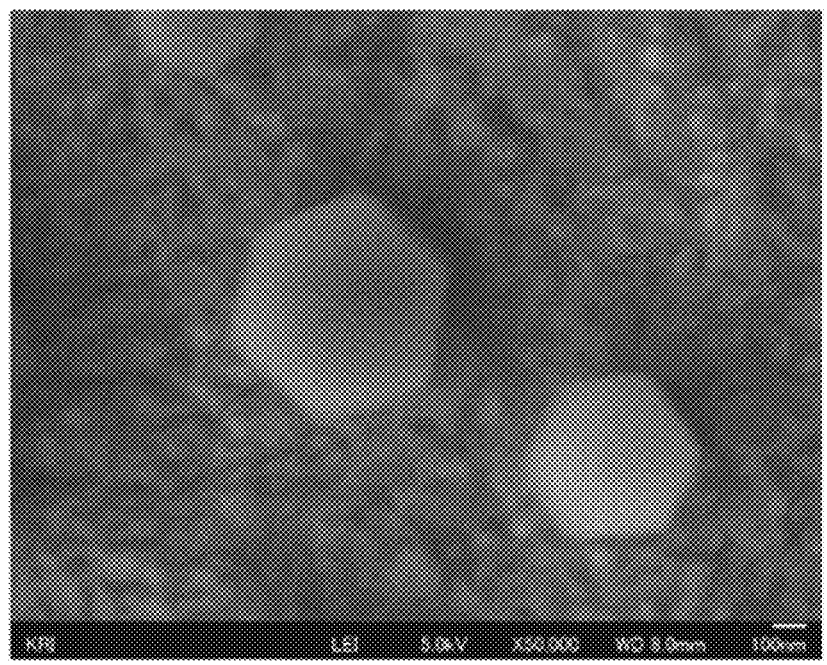
FIG. 11 is an SEM image showing the result of "morphological observation of precipitated Mg" in Example of the present specification according to an embodiment of the present technology.

The magnesium electrode-based electrolytic solution according to the present technology may have a specific form of magnesium precipitated by charging and discharging. At the negative electrode, magnesium is precipitated from the solvent in charging (in the following, also referred to as "precipitated magnesium"), while a phenomenon may occur in which the precipitated magnesium is dissolved in the solvent in discharging, and however, the precipitated magnesium can have a geometrical grain shape in such charging and discharging. For example, the precipitated magnesium generated on the negative electrode may have a form shown in FIG. 11 with reference to Examples described later. The term "geometric grain shape" as used in the present specification means that the shape of the precipitated magnesium has a nomothetic or regular shape in a broad sense, and the shape of the precipitated magnesium in a planar view (particularly in the shape in SEM images) has a nomothetic or regular shape in a narrow sense. A "geometric" shape is a polygonal shape that reflects the symmetry of a crystal, such as a triangle, quadrangle, or hexagon. In a preferred embodiment, as shown in FIG. 11, the precipitated magnesium is granular with a substantially regular hexagon. In a broad sense, the grain" in "the geometric grain shape" means a shape in which the precipitated magnesium is individually small (especially a small shape recognized by those skilled in the art of the electrolytic solution of the secondary battery).

In the magnesium electrode-based electrolytic solution according to the present technology, it is considered that the "geometric grain shape" of the precipitated magnesium is directly or indirectly related to the improvement of the coulomb efficiency of the negative electrode. Although not bound by a specific theory, in the case of "geometric grain shape", it is considered that "Mg grains" can be precipitated in a denser state on the negative electrode, and the surface area of the precipitated magnesium (particularly the surface area in contact with the solvent of the electrolytic solution) becomes smaller as a whole due to such a "dense state" plurality of particles is precipitated in a dense state), which is related to the improvement of coulombic efficiency of the negative electrode. That is, it is considered that since the precipitated magnesium having a geometric grain shape is preferably precipitated in "closest packing", the surface area of the electrolytic solution in contact with the solvent can be reduced as a whole, which affects the improvement of coulomb efficiency.

The magnesium electrode-based electrolytic solution according to the present technology is suitable for an electrochemical device including a magnesium electrode as a negative electrode, and more preferably the case in which the device has a sulfur electrode as a positive electrode. That is, the electrolytic solution of the present technology is an electrolytic solution for an electrochemical device including a magnesium electrode as a negative electrode, and preferably, the positive electrode of the electrochemical device is a sulfur electrode. In the case of an electrochemical device including a pair of such magnesium electrode-sulfur electrodes (in the following, also referred to as "a magnesium-sulfur electrode-based electrochemical device"), the electrolytic solution of the present technology at least exerts the effect of improving the coulomb efficiency of the negative electrode in the electrode-based electrochemical device. As described above, in the case in which the second magnesium salt contains the halogen metal salt and the imide metal salt, such a halogen metal salt is magnesium chloride ($MgCl_2$), and the imide salt is a magnesium salt of pertluoroalkyl sulfonyl imide (e.g. $Mg(TFSI)_2$), preferred cycle characteristics of the positive electrode can be expected as well. Magnesium bis(hexamethyldisilazide) is combined with such a "non-disilazide" magnesium salt, and thus preferred cycle characteristics of the positive electrode as well as the negative electrode the improvement of coulombic efficiency can be further expected. Assuming the case in which the electrochemical device is secondary battery, this means that a magnesium-sulfur battery more preferably achieving both of desired cycle characteristics for the positive electrode and the improvement of the coulombic efficiency of the negative electrode.

[Electrochemical Device of the Present Technology]

Next, the electrochemical device of the present technology will be described. Such an electrochemical device includes a negative electrode and a positive electrode, and a magnesium electrode is provided as the negative electrode. Such an electrochemical device is characterized in that the electrolytic solution is composed of at least the above-described electrolytic solution.

That is, the electrolytic solution of the electrochemical device of the present technology includes at least a solvent and a magnesium salt, and the solvent is an ether solvent, preferably a linear ether. That is, the electrochemical device contains an ether having a linear molecular structure as an electrolytic solution solvent, not a cyclic ether such as tetrahydrofuran.

In the electrochemical device of the present technology, the negative electrode is a magnesium electrode, and thus corresponds to a magnesium electrode-based electrochemical device. In the electrolytic solution used in such a magnesium electrode-based electrochemical device, the linear ether solvent is another expressed by the following general formula.

[Chemical Formula 1]

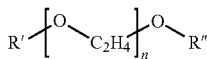

In the formula, R' and R" are each independently a hydrocarbon group having one or more and ten or less carbon atoms, and n is an integer of one or more and ten or less.

In such a magnesium electrode-based electrochemical device, the linear ether of the electrolytic solution solvent has an ethyleneoxy structural unit. As described above, in the linear ether having such an ethyleneoxy structural unit, R' and R" in the general formula may independently be one or more and ten or less aliphatic hydrocarbon groups. In a linear ether having such an ethyleneoxy structural unit, n in the general formula may be an integer of two or more and four or less, and thus, the linear ether solvent may be ether having two or more and four or more ethyleneoxy structural units. Further, in the solvent of the linear ether having an "ethyleneoxy structural unit", in the general formula, R' and R" may be independently lower alkyl groups having one or more and four or less carbon atoms. In a linear ether solvent having an "ethyleneoxy structural unit", R' and R" may be the same alkyl groups in the general formula.

Although it is only an example, in the magnesium electrode system electrochemical device according to the present technology, the linear ether solvent having "ethylene oxy structural units" is at least one kind selected from a group consisting of ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, and polyethylene glycol dimethyl ether.

In the magnesium electrode-based electrochemical device, the linear ether of the electrolytic solution solvent coexists with the magnesium salt, and the linear ether contains, as such magnesium salt, the first magnesium salt having a disilazide structure expressed by the general formula $(R_3Si)_2N$ (in the formula, R is a hydrocarbon radical with one or more and ten or less carbon atoms) and the second magnesium salt without the disilazide structure. In other words, the magnesium salt is not simply contained in the linear ether solvent, and such magnesium salts are two specific kinds from the viewpoint of the "disilazide". Exactly with the electrolytic solution having such a configuration, the magnesium electrode-based electrochemical device according to the present technology can exhibit a coulomb efficiency in which the negative electrode is further improved.

The first magnesium salt coexisting with the linear ether used as the electrolytic solution solvent of the magnesium electrode-based electrochemical device is a metal salt having a disilazide structure expressed by the general formula $(R_3Si)_2N$. As described above, R in the di silazide structure of the first magnesium salt may be an aliphatic hydrocarbon group having one or more and ten or less carbon atoms, which may consist of saturated hydrocarbons or may consist of unsaturated hydrocarbons. For example, the aliphatic hydrocarbon group may be an alkyl group, preferably a lower alkyl group having one or more and four or less carbon atoms. One preferred form is a first magnesium salt having a methyl group in a disilazide structure. Such a first magnesium salt may be, for example, magnesium bis(hexamethyldisilazide), i.e., $Mg(HMDS)_2$. With the use of such a first magnesium salt, the improvement of coulombic efficiency of the electrochemical device (particularly the magnesium electrode-based device) is easily exerted. Such a magnesium bis(hexamethyldisilazide) is combined with the halogen metal salt and the imide metal salt, and thus the improvement of coulombic efficiency of the electrochemical device is more easily exerted.

The second magnesium salt coexisting with the linear ether used as the electrolytic solution solvent of the electrochemical device of the magnesium electrode system is preferably a halogen metal salt and an imide metal salt. The halogen metal salt may be magnesium chloride ($MgCl_2$), for example, and the imide salt may be a magnesium salt of perfluoroalkyl sulfonyl imide, $Mg(TFSI)_2$, for example. $MgCl_2$ and $Mg(TFSI)_2$ are relatively high stable Mg salts. Therefore, even though $MgCl_2$ and $Mg(TFSI)_2$ are contained in a high concentration in a linear ether solvent, high safety can be obtained. This can be an advantage over conventional electrolytic solutions with $AlCl_3$ and Grignard. Since $MgCl_2$ and $Mg(TFSI)_2$ have low reactivity, side reactions other than the electrochemical reaction with sulfur do not occur, and higher capacity can be expected. Since the overvoltage of magnesium precipitation and dissolution is low, the charging and discharging hysteresis can be narrower than in the conventional reported examples, and in that point, a device with a higher energy density can be expected as well. Since the total Mg salt concentration can be made very high, high ionic conductivity and high rate characteristics can be expected, and the freezing point is lower and the boiling point is higher, and thus electrochemical devices with a wide temperature range can be achieved.

In the case in which two salts are used as the second magnesium salt, the amounts of substance of these salts may be similar (in one specific example, the amounts of substance may be molar amounts equivalent to each other). Although not particularly limited, taking the combination of $MgCl_2$ and $Mg(TFSI)_2$ as an example, the molar ratio of $MgCl_2:Mg(TFSI)_2$ may be about 1:0.5 to 2.0, about 1:0.5 to 1.25, for example.

In the electrochemical device of the present technology, magnesium precipitated with charging and discharging can have a geometric grain shape. For example, as described above, precipitated magnesium may have a polygonal grain shape that reflects the symmetry of crystals such as triangles, quadrangles, and hexagons. In a preferred embodiment, the precipitated magnesium produced on the negative electrode in charging has a form shown in FIG. 11 referred to in Examples below. In the electrochemical device of the present technology, it is presumed that the fact that such precipitated magnesium has a "geometric grain shape" is directly or indirectly related to the improvement of the coulomb efficiency of the negative electrode. It is considered that this relates to a fact that as described in [Electrolytic solution for the electrochemical device of the present technology], the precipitated magnesium is in a denser state (preferably, reclosest packing) due to "a geometrical grain shape".

In the electrochemical device of the present technology, preferably, the positive electrode is a sulfur electrode containing at least sulfur. That is, the sulfur electrode of the electrochemical device of the present technology is preferably formed as a positive electrode of sulfur (S) such as $S_8$ and/or polymeric sulfur. Since the negative electrode is a magnesium electrode, the electrochemical device of the present technology is an electrochemical devi provided with a pair of magnesium electrode-sulfur electrodes and has a suitable electrolytic solution, the improvement of coulombic efficiency of the negative electrode can be intended while providing desired cycle characteristics to such a positive electrode.

Since the sulfur electrode is an electrode containing at least sulfur, the sulfur electrode may contain a conductive auxiliary agent and/or a binder and the like, in addition to this. In such a case, the sulfur content in the sulfur electrode may be 5% by mass or more and 95% by mass or less, preferably 70% by mass or more and 90% by mass or less based on the overall standard of the electrode.

For example, examples of the conductive auxiliary agent contained in the sulfur electrode used as the positive electrode include carbon materials such as graphite, carbon fiber, carbon black, and carbon nanotubes, and one type or two or more of these can be used in a mixture. As the carbon fiber, for example, vapor growth carbon fiber (VGCF (registered trademark)) or the like can be used. As the carbon black, for example, acetylene black and/or Ketjen black can be used. As the carbon nanotubes, for example, multi-wall carbon nanotubes (MWCNTs) such as single-wall carbon nanotubes (SWCNTs) and/or double-wall carbon nanotubes (DWCNTs) can be used. As long as the material has good conductivity, a material other than the carbon material can be used, and for example, a metal material such as Ni powder and/or a conductive polymer material can be used. Examples of the binder contained in the sulfur electrode used as the positive electrode can include fluoro resins such as polyvinylidene fluoride (PVdF) and/or polytetrafluoroethylene (PTFE), polyvinyl alcohol (PVA) resins, and/or a polymer resin such as a styrene-butadiene copolymer rubber (SBR) resin. As a binder, a conductive polymer may be used. As the conductive polymer, for example, substituted or unsubstituted polyaniline, polypyrrole, polythiophene, and a (co)polymer composed of one or two kinds selected from these can be used.

On the other hand, in the electrochemical device of the present technology, the material (specifically, the negative electrode active material) constituting the negative electrode is made of a magnesium metal alone, a magnesium alloy or a magnesium compound because of a "magnesium electrode". In the case in which the negative electrode is made of a single metal of magnesium (e.g. a magnesium plate), the Mg purity of the single metal is 90% or more, preferably 95% or more, and more preferably 98% or more. Although the negative electrode can be produced from, for example, a plate-like material or a foil-like material, the present technology is not limited to this, and the negative electrode can also be formed (shaped) using powder.

The negative electrode may have a structure in which a negative electrode active material layer is formed in the vicinity of the surface the negative electrode. For example, the negative electrode may be a negative electrode having a layer with magnesium ion conductivity, the layer containing magnesium (Mg) as a negative electrode active material layer, the layer further containing at least any of carbon (C), oxygen (O), sulfur (S), and halogen. Such a negative electrode active material layer is merely an exemplary category, but may have a single peak derived from magnesium in the range of 40 eV or more and 60 eV or less, Examples of the halogen can include at least one kind selected from the group consisting of fluorine (F), chlorine (Cl), bromine (Br), and iodine (I). In such a case, a single peak derived from magnesium is included in the range of 40 eV or more and 60 eV or less, extending from the surface of the negative electrode active material layer to a depth of $2 \times 10^{-7}$ m. This is because the negative electrode active material layer exhibits good electrochemical activity extending from the surface to the inside. From the same reason, the oxidation state of magnesium may be substantially constant over $2 \times 10^{-7}$ nm in the depth direction from the surface of the negative electrode active material layer. Here, the surface of the negative electrode active material layer means a surface of both sides of the negative electrode active material layer that constitutes the surface of the electrode, and the back surface is a surface opposite to this surface, i.e., a surface on the side forming the interface between the electric body and the negative electrode active material layer, Whether the negative electrode active material layer contains the elements can be confirmed based on an XPS (X-ray Photoelectron Spectroscopy) method. Whether the negative electrode active material layer has the peak and whether the negative electrode active material layer has the oxidation state of magnesium can also be similarly confirmed based on the XPS method.

In the electrochemical device of the present technology, preferably, the positive electrode and the negative electrode are separated by an inorganic separator or an organic separator through which magnesium ions pass while preventing a short circuit due to contact between the two electrodes. Examples of the inorganic separator can include a glass filter and glass fiber. Examples of the organic separator include a porous membrane made of a synthetic resin made of polytetrafluoroethylene, polypropylene and/or polyethylene, and a structure in which two or more of these porous membranes are laminated may be used. Above all, the porous membrane made of polyolefin is preferable because it has an excellent short-circuit prevention effect and can improve the safety of the battery by a shutdown effect.

The electrolytic solution layer in the electrochemical device can be composed of the above-described electrolytic solution of the present technology and a polymer compound composed of a retainer that holds the electrolytic solution. The polymer compound may be one that is swollen by the electrolytic solution. In this case, the polymer compound swollen by the electrolytic solution may be in a gel form. Examples of such polymer compounds can include polyacrylonitrile, polyvinylidene fluoride, copolymers of vinylidene fluoride and hexafluoropropylene, polytetrafluoroethylene, polyhexafluoropropylene, polyethylene oxide, polypropylene oxide, polyphosphazene, polysiloxane, Polyvinylacetate, polyvinyl alcohol, polymethylmethacrylate, polyacrylic acid, polymethacrylic acid, styrene-butadiene rubber, nitrile-butadiene rubber, polystyrene, and/or polycarbonate. In particular, polyacrylonitrile, polyvinylidene fluoride, polyhexafluoropropylene, or polyethylene oxide may be used when electrochemical stability is more important. The electrolyte layer may be a solid electrolyte layer.

The magnesium electrode-based electrochemical device described above can be formed as a secondary battery, and a conceptual diagram in that case is shown in FIG. 1. As shown in FIG. 1, in charging, magnesium ions ($Mg^{2+}$) move from a positive electrode 10 to a negative electrode 11 through an electrolytic solution layer 12, and thus electrical energy is converted into chemical energy and store the chemical energy. In discharging, electric energy is generated by returning magnesium ions from the negative electrode 11 through the electrolytic solution layer 12 to the positive electrode 10.

When the electrochemical device is a battery (primary battery or secondary battery) composed of the above-described electrolytic solution of the present technology, the battery may be, for example, can be used as a driving power supply or auxiliary power supply for a notebook personal computers, PDAs (mobile information terminals), mobile phones, smartphones, cordless phone masters/slaves, video movies, digital still cameras, electronic books, electronic dictionaries, portable music players, radios, headphones, game consoles, navigation systems, memory cards, heart pacemakers, hearing aids, power tools, electricity shavers, refrigerators, air conditioners, television receivers, stereos, water heaters, microwave ovens, dishwashers, washing machines, dryers, lighting devices, toys, medical devices, robots, road conditioners, traffic lights, railroad vehicles, golf carts, electric carts, and/or electric vehicles (including hybrid vehicles). The electrochemical device can be installed as a power storage power supply for a building such as a house or a power generation facility, or can be used to supply power to these. In an electric vehicle, a conversion device that converts electric power into driving force by supplying electric power is generally a motor. The control device (control unit) that processes information related to vehicle control includes a control device that displays the remaining battery level based on information on the remaining battery level. Batteries can also be used in power storage devices in sip-called smart grids. Such a power storage device can not only supply power but also store power by receiving power from another power supply. As other power supplies, for example, thermal power generation, nuclear power generation, hydroelectric power generation, solar cells, wind power generation, geothermal power generation, and/or fuel cells (including biofuel cells) can be used.

The electrochemical device (i.e., secondary battery) of the present technology can be applied to a secondary battery, a control section (or a control unit) for controlling the secondary battery, and a battery pack having an exterior containing the secondary battery. In such a battery pack, the control section controls, for example, charging and discharging, overdischarge, or overcharge of the secondary battery.

The electrochemical device of the present technology (that is, a secondary battery) can also be applied to an electronic device that receives power from a secondary battery.

The electrochemical device of the technology (i.e., secondary battery) can also be applied to electric vehicles having a converter that receives power from the secondary battery and converts the power into the driving force of the vehicle, and a control device (or control unit) that processes information related to vehicle control based on information on the secondary battery. In such an electric vehicle, the converter typically receives power from a secondary battery to drive the motor and generate driving force. Regenerative energy can also be used to drive the motor. The control device (or control unit) performs information processing related to vehicle control based on, for example, the remaining battery level of the secondary battery. Such electric vehicles include, for example, electric vehicles, electric motorcycles, electric bicycles, railroad vehicles, and so-called hybrid vehicles.

The electrochemical device of the present technology can be applied to a secondary battery in a power system configured to receive power from a secondary battery and/or to supply power to the secondary battery from a power supply. Such an electric power system may be any electric power system as long as the electric power system uses approximately electric power, and includes a simple electric power device. Such electric power systems include, for example, smart grids, household energy management systems (HEMS), and/or vehicles, and can also store electricity.

The electrochemical device (i.e., secondary battery) of the present technology can be applied in a power storage power supply having a secondary battery and configured to be connected to an electronic device to which power is supplied. Such an electric power storage power supply is used for any purpose, and can be basically used for any electric power system or electric power device, and can be used for a smart grid, for example.

Other matters such as more detailed matters and more specific embodiments of the electrochemical device of the present technology are described in [Electrolytic solution for the electrochemical device of the present technology] described above, and the description is omitted to avoid duplication.

Here, the case in which the magnesium electrode-based electrochemical device of the present technology is used as a secondary battery will be described in more detail. In the following, such a secondary battery is also referred to as a "magnesium secondary battery".

The magnesium secondary battery as an electrochemical device of the present technology can be applied to a machine, device, appliance, device, and system (an assembly of a plurality of devices, for example) without particular limitation. The magnesium secondary battery used as a power supply (e.g. a magnesium-sulfur secondary battery) may be a main power supply (a power supply used preferentially), or an auxiliary power supply (instead of the main power supply, or may be a power supply that is used by switching from the main power supply). In the case in which a magnesium secondary battery is used as an auxiliary power supply, the main power supply is not limited to the magnesium secondary battery.

Examples of applications of the magnesium secondary battery (particularly the magnesium-sulfur secondary battery) include various electronic devices such as video cameras, camcorders, digital still cameras, mobile phones, personal computers, television receivers, various display devices, cordless phones, headphone stereos, music players, portable radios, electronic books, and/or electronic papers such as electronic newspapers, portable information terminals including PDAs, and electrical devices (including portable electronic devices); toys; portable living appliances such as electric shavers; lighting appliances such as interior lights; medical electronic devices such as pacemakers and/or hearing aids; storage devices such as memory cards; battery packs used for personal computers as removable power supplies; power tools such as electric drills and/or electric saws; power storage systems such as household battery systems that store power in case of emergency, home energy servers (household power storage devices), and power supply systems; power storage units and/or backup power supplies; electric vehicles such as electric cars, electric bikes, electric bicycles, and/or Segway (registered trademark); driving electric power converters (specifically, for example, power motors) for aircraft and/or ships, and however, the present technology is not limited to these uses.

Among them, the magnesium secondary battery (particularly the magnesium-sulfur secondary battery) is effectively applied to battery packs, electric vehicles, power storage systems, power supply systems, power tools, electronic devices, and/or electrical devices. The battery pack is a power supply using a magnesium secondary battery, and is a so-called assembled battery or the like. The electric vehicle is a vehicle that operates (e.g. runs) using a magnesium secondary battery as a driving power supply, and may be a vehicle (e.g. a hybrid vehicle) that also includes a driving source other than the secondary battery. A power storage system (e.g. a power supply system) is a system that uses a magnesium secondary battery as a power storage source. For example, in a household electric power storage system (e.g. an electric power supply system), since electric power is stored in a magnesium secondary battery which is an electric power storage source, it is possible to use electric power for home use electric products. A power tool is a tool in which a movable part (e.g. a drill or the like) can move using a magnesium secondary battery as a power supply for driving. Electronic devices and electrical devices are devices that exhibit various functions using a magnesium secondary battery as a power supply for operation (i.e., a power supply source).

In the following, a cylindrical magnesium secondary battery and a flat plate type laminated film type magnesium secondary battery will be described.

Figure 2:
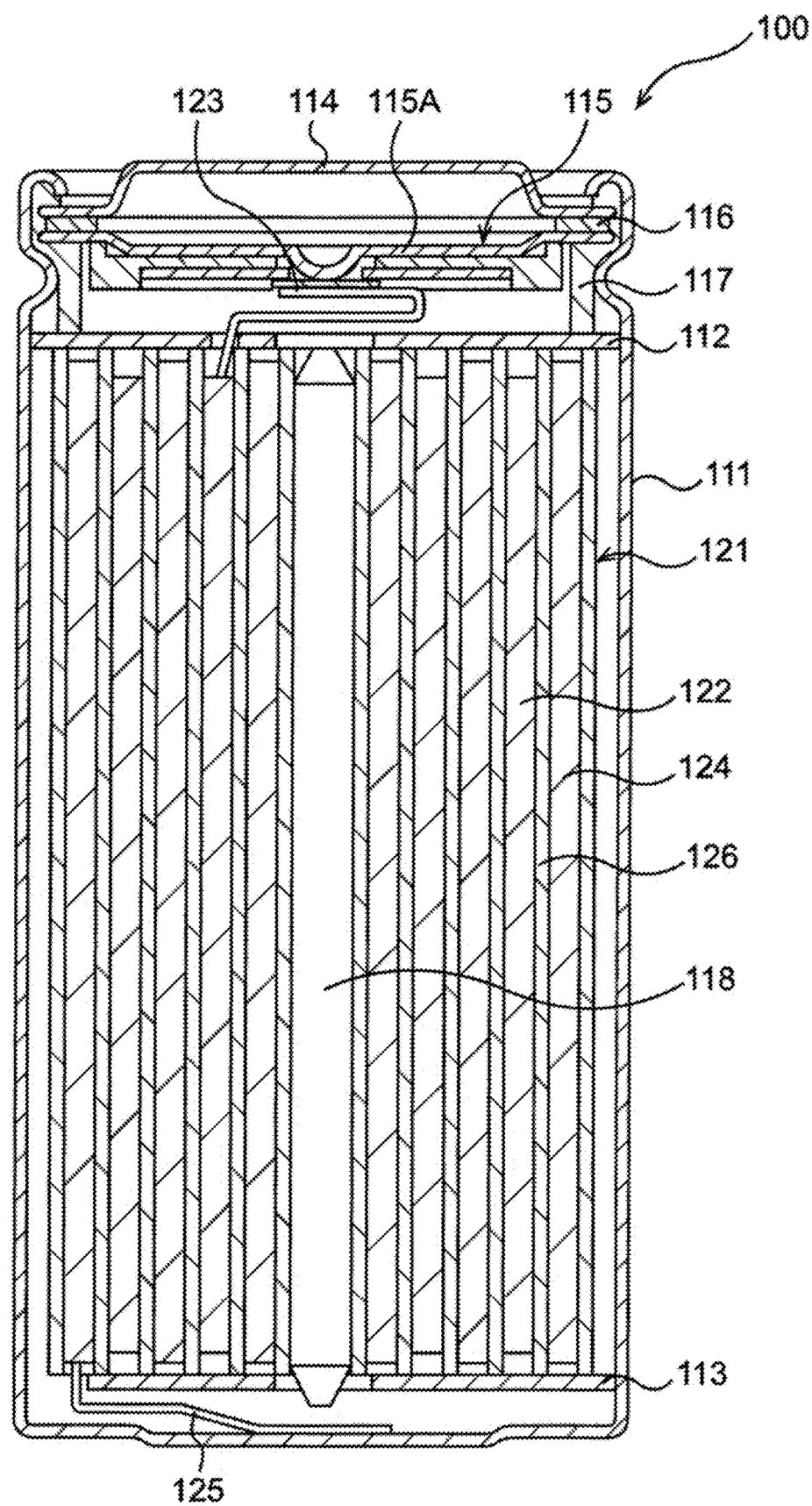
FIG. 2 is a schematic sectional view of a magnesium secondary battery (cylindrical magnesium secondary battery) provided as an embodiment of the present technology.

A schematic sectional view of a cylindrical magnesium secondary battery 100 is shown in FIG. 2. In the magnesium secondary battery 100, an electrode structure 121 and a pair of insulating plates 112 and 113 are housed in the inside of an electrode structure storage member 111 having a substantially hollow columnar shape. The electrode structure 121 can be prepared in which a positive electrode 122 and a negative electrode 124 are laminated with a separator 126, for example, interposed therebetween to obtain an electrode structure, and then the electrode structure is wound. The electrode structure storage member (e.g. a battery can) 111 has a hollow structure in which one end is closed and the other end is opened, and is made of iron (Fe) and/or aluminum (Al) or the like. The pair of insulating plates 112 and 113 sandwich the electrode structure 121 and are arranged so as to extend perpendicularly to the winding circumferential surface of the electrode structure 121. At the open end of the electrode structure storage member 111, a battery lid 114, a safety valve mechanism 115, and a heat-sensitive resistance element (e.g. a PTC element or a Positive Temperature Coefficient element) 116 are crimped with a gasket 117, and thus the electrode structure storage member 111 is hermetically sealed. The battery lid 114 is made of, for example, the same material as the electrode structure storage member 111. The safety valve mechanism 115 and the heat-sensitive resistance element 116 are provided on the inner side of the battery lid 114, and the safety valve mechanism 115 is electrically connected to the battery lid 114 with the heat-sensitive resistance element 116 interposed therebetween. In the safety valve mechanism 115, the disc plate 115A is reversed when the internal pressure exceeds a certain level due to an internal short circuit and/or heating from the outside, for example. As a result, the electrical connection between the battery lid 114 and the electrode structure 121 is cut off. In order to prevent abnormal heat generation due to a large current, the resistance of the heat-sensitive resistance element 116 increases as the temperature rises. The gasket 117 is made of, for example, an insulating material. Asphalt or the like may be applied to the surface of the gasket 117.

A center pin 118 is inserted in the winding center of the electrode structure 121. However, the center pin 118 does not necessarily have to be inserted at the center of winding. To the positive electrode 122, a positive electrode lead part 123 made of a conductive material such as aluminum is connected. Specifically, the positive electrode lead part 123 is attached to a positive electrode current collector. To the negative electrode 124, a negative electrode lead part 125 made of a conductive material such as copper is connected. Specifically, the negative electrode lead part 125 is attached to the negative electrode current collector. The negative electrode lead part 125 is welded to the electrode structure storage member 111, and is electrically connected to the electrode structure storage member 111. The positive electrode lead part 123 is welded to the safety valve mechanism 115, and is electrically connected to the battery lid 114. In the example shown in FIG. 2, the negative electrode lead part 125 is provided at one location (the outermost circumferential portion of the wound electrode structure), and however, the negative electrode lead part 125 may be provided at two locations (the outermost circumferential portion and the outermost portion of the wound electrode structure).

The electrode structure 121 is formed of the positive electrode 122 and the negative electrode 124 laminated with the separator 126 interposed therebetween, the positive electrode 122 having positive electrode active material layers formed on the positive electrode current collector (more specifically, on both sides of the positive electrode current collector), the separator 126 having negative electrode active material layers formed on the negative electrode current collector(more specifically, on both sides of a negative electrode current collector). In the region of the positive electrode current collector to which the positive electrode lead part 123 is attached, the positive active material layer is not formed, and in the region of the negative electrode current collector to which the negative electrode lead part 125 is attached, the negative electrode active material layer is not formed.

The magnesium secondary battery 100 can be manufactured, for example, based on the following procedure.

First, positive electrode active material layers are formed on both sides of the positive electrode current collector, and negative electrode active material layers are formed on both sides of the negative electrode current collector.

Subsequently, the positive electrode lead part 123 is attached to the positive electrode current collector using a welding method or the like. The negative electrode lead part 125 is attached to the negative electrode current collector using a welding method or the like. Next, the positive electrode 122 and the negative electrode 124 are laminated and wound via a separator 126 made of a macroporous polyethylene film (more specifically, the electrode structure of the positive electrode 122/separator 126/negative electrode 124/separator 126 (i.e., the laminated structure) to prepare the electrode structure 121, and then a protective tape (not shown) is attached to the outermost circumferential portion. After that, the center pin 118 is inserted into the center of the electrode structure 121. Subsequently, the electrode structure 121 is housed in the inside of the electrode structure storage member 111 while the electrode structure 121 is sandwiched between the pair of insulating plates 112 and 113. In this case, the tip end of the positive electrode lead part 123 is attached to the safety valve mechanism 115 and the tip end of the negative electrode lead part 125 is attached to the electrode structure storage member 111 using a welding method or the like. After that, the electrolytic solution is injected based on the reduced pressure method to impregnate the separator 126 with the electrolytic solution. Subsequently, the battery lid 114, the safety valve mechanism 115, and the heat-sensitive resistance element 116 are crimped to the opening end of the electrode structure storage member 111 with the gasket 117.

Figure 3:
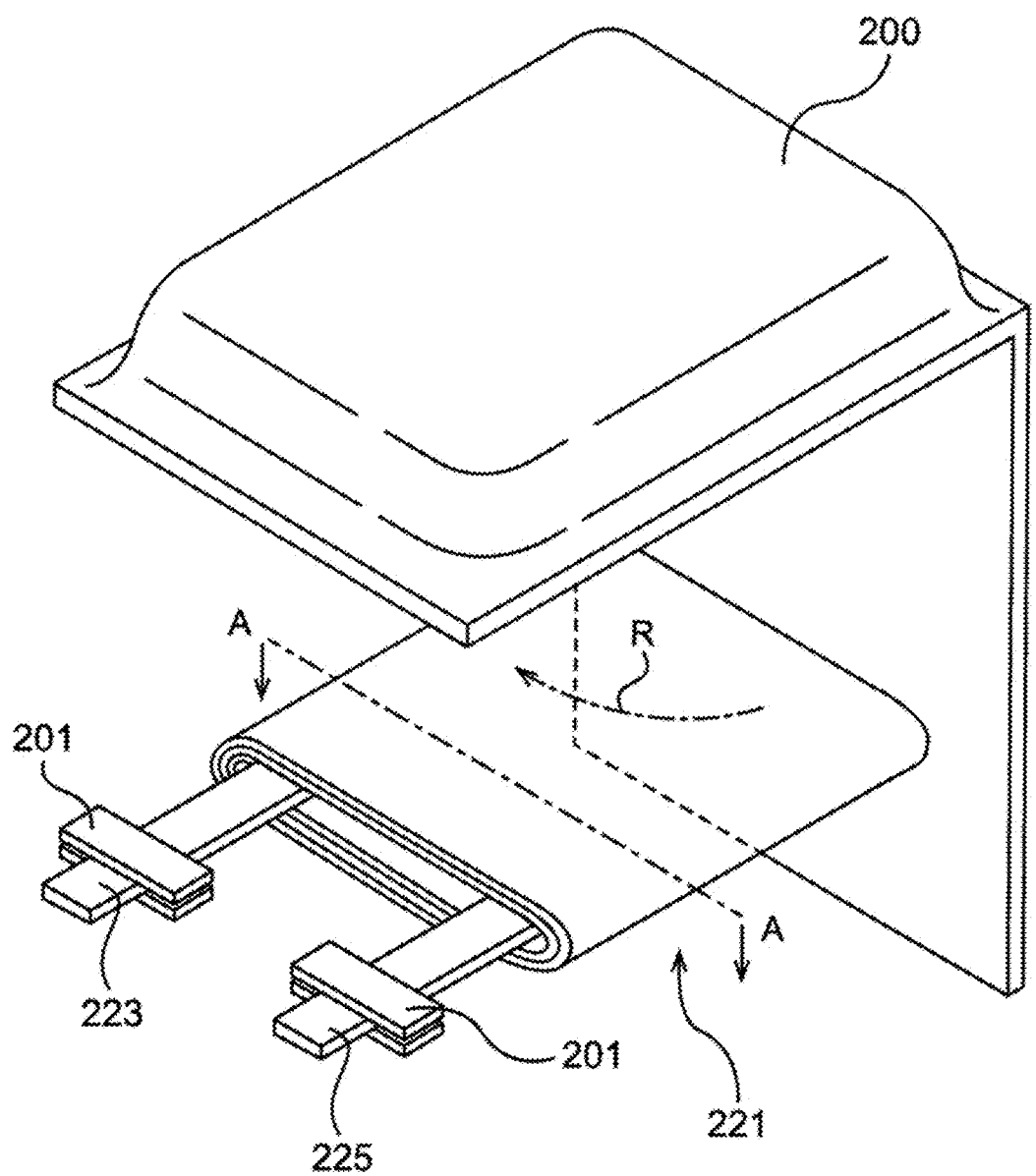
FIG. 3 is a schematic perspective view of a magnesium secondary battery (flat plate type laminated film type magnesium secondary battery) provided as an embodiment of the present technology.

Next, a flat plate type laminated film type secondary battery will be described. FIG. 3 shows a schematic exploded perspective view of such a secondary battery. In this secondary battery, an electrode structure 221 basically the same as described above is housed in the inside of an exterior member 200 made of a laminated film. The electrode structure 221 can prepared in which a positive electrode and a negative electrode are laminated with the separator and the electrolyte layer interposed therebetween, and then this laminated structure is wound. To the positive electrode, a positive electrode lead part 223 is attached, and to the negative electrode, a negative electrode lead part 225 is attached. The outermost peripheral portion of the electrode structure 221 is protected by a protective tape. The positive electrode lead part 223 and the negative electrode lead part 225 project in the same direction from the inside to the outside of the exterior member 200. The positive electrode lead part 223 is formed of a conductive material such as aluminum. The negative electrode lead part 225 is formed of a conductive material such as copper, nickel, and/or stainless steel.

The exterior member 200 is a single film that can be folded in the direction of the arrow shown in FIG. 3, and a part of the exterior member 200 is provided with a recess (e.g. embossing) for housing the electrode structure 221. The exterior member 200 is, for example, a laminated film in which a fusion layer, a metal layer, and a surface protective layer are laminated in this order. In the manufacturing process of the secondary battery, the exterior member 200 is folded such that the fused layers face each other with the electrode structure 221 interposed therebetween, and then the outer edges of the fused layers are fused to each other. However, the exterior member 200 may be one in which two separate laminated films are bonded together with an adhesive or the like interposed therebetween. The fused layer is made of, for example, a film such as polyethylene and/or polypropylene. The metal layer is made of, for example, an aluminum foil or the like. The surface protective layer is made of, for example, nylon and/or polyethylene terephthalate. Above all, the exterior member 200 is preferably an aluminum laminated film in which a polyethylene film, an aluminum foil, and a nylon film are laminated in this order. However, the exterior member 200 may be a laminated film having another laminated structure, a polymer film such as polypropylene, or a metal film. Specifically, the exterior member 200 may be made of a moisture-resistant aluminum laminate film in which a nylon film, an aluminum foil, and a non-stretched polypropylene film are laminated in this order from the outside.

In order to prevent the intrusion of outside air, a close contact film 201 is inserted between the exterior member 200 and the positive electrode lead part 223, and between the exterior member 200 and the negative electrode lead part 225. The close contact film 201 may be made of a material having a close contact property to the positive electrode lead part 223 and the negative electrode lead part 225, a polyolefin resin, for example, and more specifically, the close contact film 201 may be made of a polyolefin resin such as polyethylene, polypropylene, modified polyethylene, and modified polypropylene.

Although the description has focused primarily on secondary batteries above, the disclosure is similarly applied to other electrochemical devices such as capacitors, air batteries, and fuel cells. This will be described below.

Figure 4:
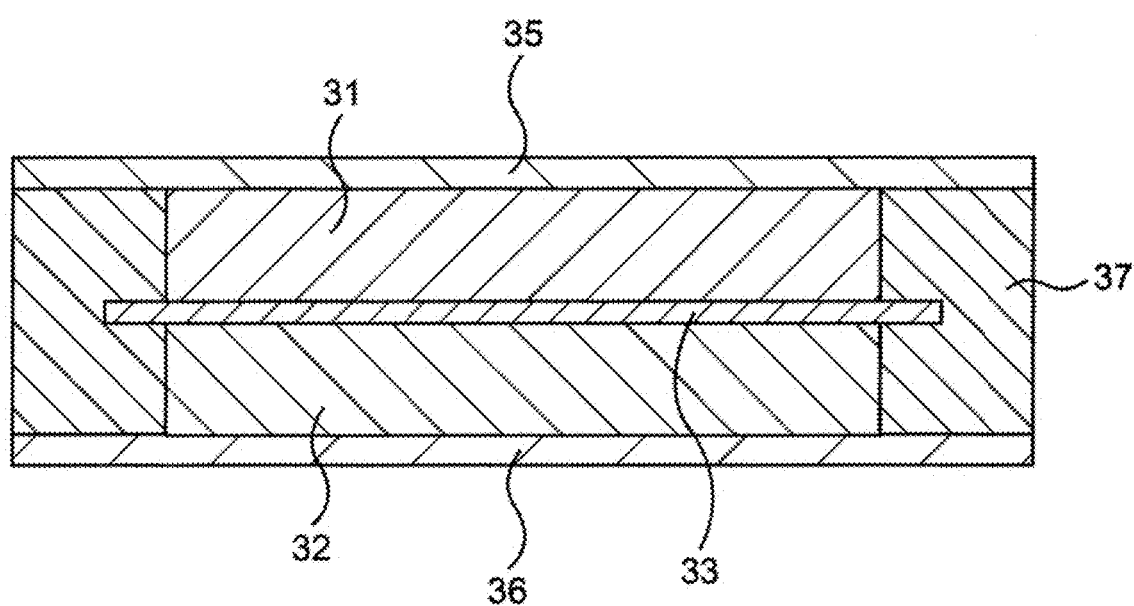
FIG. 4 is a schematic sectional view of an electrochemical device provided as a capacitor in an embodiment of the present technology.

The electrochemical device of the present technology can be provided as a capacitor as a schematic sectional view is shown in FIG. 4. In the capacitor, a positive electrode 31 and a negative electrode 32 are disposed opposite to each other with a separator 33 interposed therebetween, the separator 33 being impregnated with an electrolytic solution. On at least one surface of the separator 33, the positive electrode 31, and the negative electrode 32, a gel electrolyte film impregnated with the electrolytic solution of the present technology may be disposed. Reference numbers 35 and 36 indicate current collectors, and reference number 37 indicates gasket.

Figure 5:
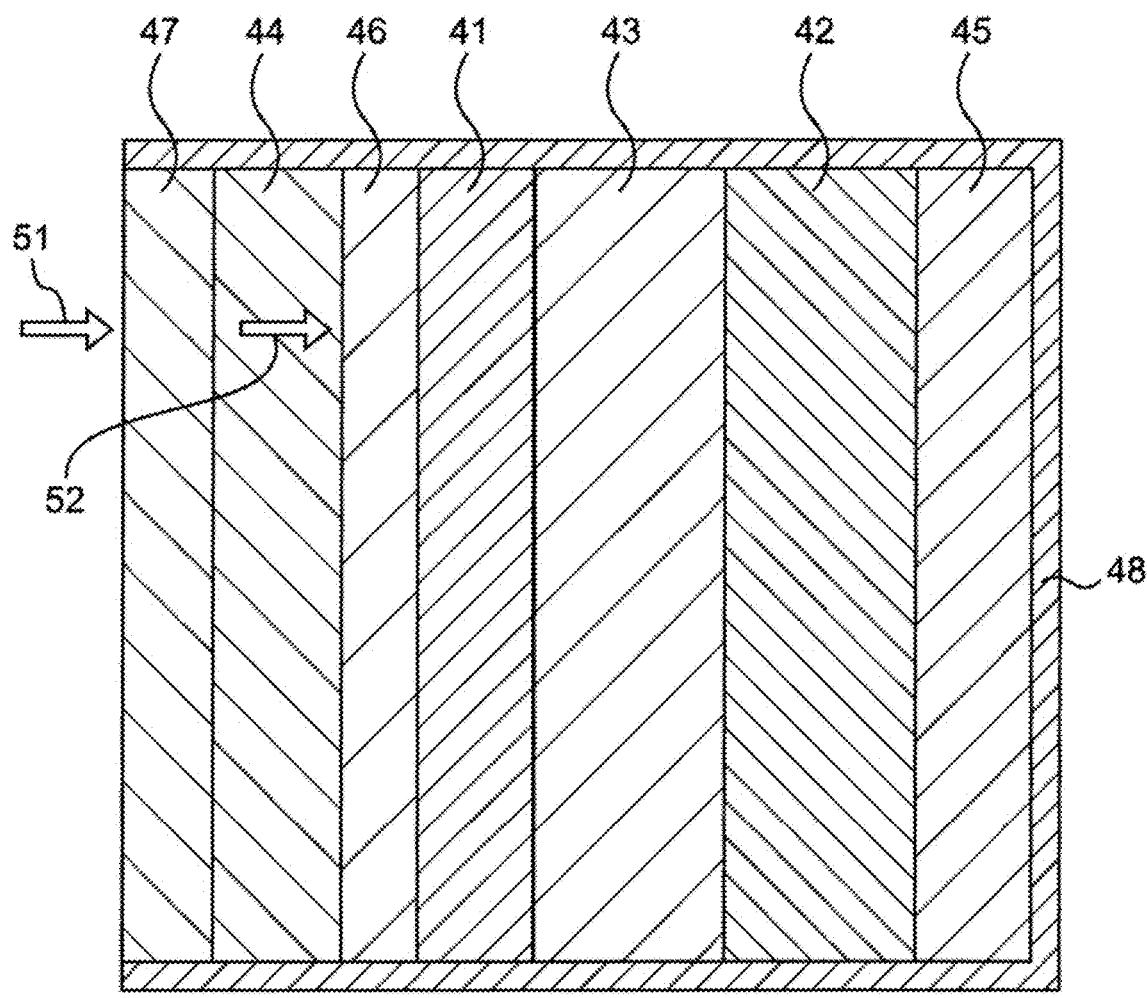
FIG. 5 is a schematic sectional view of an electrochemical device provided as an air battery in an embodiment of the present technology.

Alternatively, the electrochemical device of the present technology can also be provided as an air battery, as shown in a conceptual diagram of FIG. 5. Such an air battery includes, for example, an oxygen-selective permeable film 47 that hardly permeates water vapor and selectively permeates oxygen, an air electrode side current collector 44 made of a conductive porous material, a porous diffusion layer 46 disposed between the air electrode side current collector 44 and a porous positive electrode 41 and made of a conductive material, the porous positive electrode 41 containing a conductive material and a catalyst material, a separator and an electrolytic solution (or a solid electrolytic solution containing an electrolytic solution) 43 that hardly pass water vapor, a negative electrode 42 that emits magnesium ions, a negative electrode side current collector 45, and an exterior body 48 that houses these layers.

Oxygen 52 in air (e.g. atmosphere) 51 is selectively permeated by the oxygen-selective permeable membrane 47, passes through the air electrode side current collector 44 made of a porous material, diffused by the diffusion layer 46, and is supplied to a porous positive electrode 41. Although the travel of oxygen that has passed through the oxygen selective permeable film 47 is partially blocked by the air electrode side current collector 44, the oxygen that has passed through the air electrode side current collector 44 is diffused and spread by the diffusion layer 46, and thus the oxygen is efficiently spread over the entire porous positive electrode 41, resulting in no hindrance to the supply of oxygen to the entire surface of the porous positive electrode 41 by the air electrode side current collector 44. Since the permeation of water vapor is suppressed by the oxygen-selective permeation membrane 47, deterioration due to the influence of moisture in the air is small, and oxygen is efficiently supplied to the entire porous positive electrode 41, and thus the battery output can be increased, and long term stable use is made possible.

Figure 6:
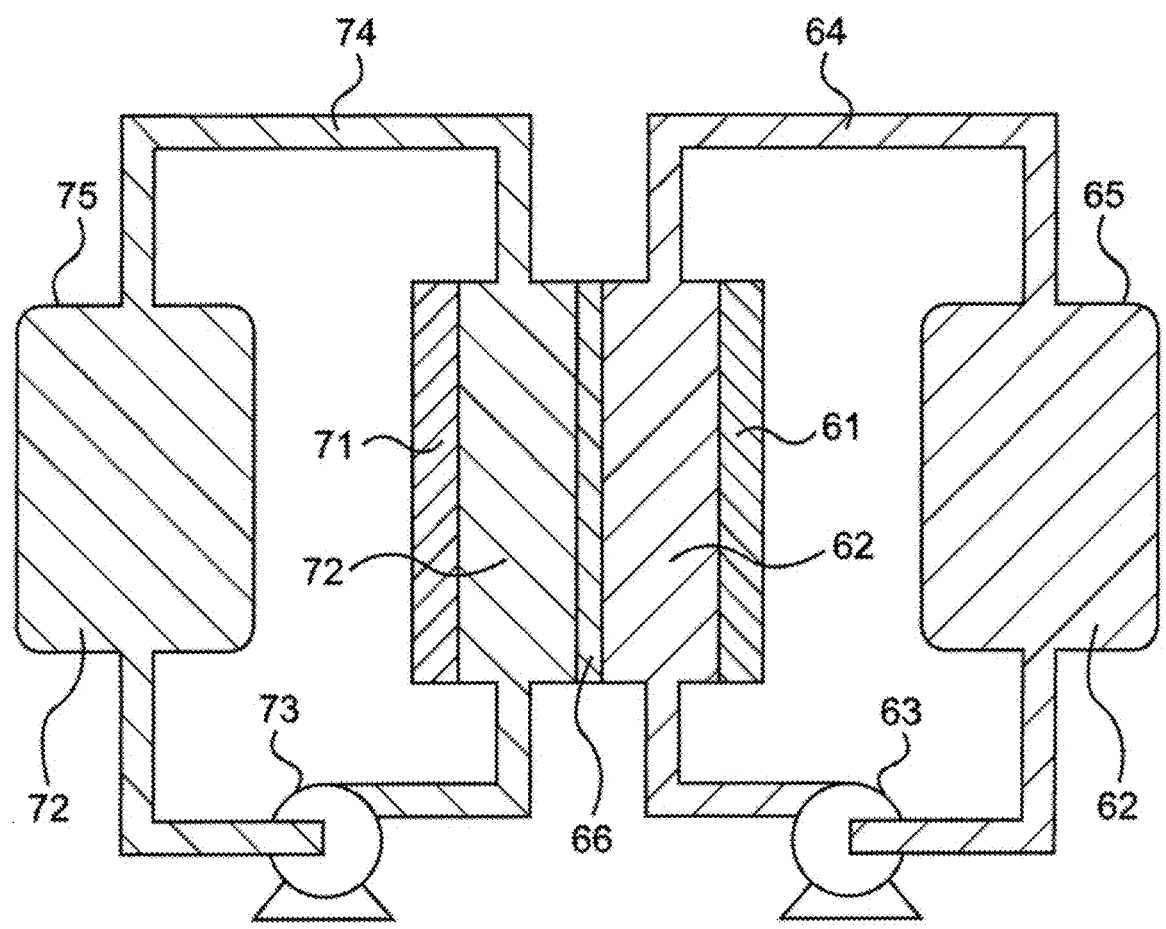
FIG. 6 is a schematic sectional view of an electrochemical device provided as a fuel cell in an embodiment of the present technology.

Alternatively, the electrochemical device of the present technology can also be provided as a fuel cell, as shown in the conceptual diagram of FIG. 6. The fuel cell includes, for example, a positive electrode 61, a positive electrode electrolytic solution 62, a positive electrode electrolytic solution transport pump 63, a fuel passage 64, a positive electrode electrolytic solution storage container 65, a negative electrode 71, a negative electrode electrolytic solution 72, a negative electrode electrolytic solution transport pump 73, a fuel passage 74, a negative electrode electrolytic solution container 75, and an ion exchange membrane 66. On the fuel passage 64, the positive electrode electrolytic solution 62 continuously or intermittently flows (circulates) passing through the positive electrode electrolytic solution container 65 and the positive electrode electrolytic solution transport pump 63, on the fuel passage 74, the negative electrode electrolytic solution 72 continuously or intermittently flows or circulates passing thought the negative electrode electrolytic solution container 75 and the negative electrode electrolytic solution transport pump 73, and electric power is generated across the positive electrode 61 and the negative electrode 71. As the positive electrode electrolytic solution 62, a positive electrode active material added to the electrolytic solution of the present technology can be used, and as the negative electrode electrolytic solution 72, a negative electrode active material added to the electrolytic solution of the present technology can be used.

As for the negative electrode in the electrochemical device, a Mg metal plate can be used, and the negative electrode can also be manufactured by the following method. For example, an Mg electrolytic solution (Mg-EnPS) containing $MgCl_2$ and EnPS (ethyl-n-propyl sulfone) is prepared, and this Mg electrolytic solution is used to precipitate Mg metal on a Cu foil based on an electrolytic plating method, and then an Mg plating layer may be formed on the Cu foil as the negative electrode active material layer. As a result of analyzing the surface of the Mg plating layer obtained by this method based on the XPS method, it is apparent that Mg, C, O, S, and Cl are present on the surface of the Mg plating layer, the Mg-derived peak observed in surface analysis was not split, and a single Mg-derived peak observed in the range of 40 eV or more and 60 eV or less. Based on the Ar sputtering method, the surface of the Mg plating layer was dug about 200 nm in the depth direction, and the surface was analyzed based on the XPS method, and as a result, it was found that no change is observed in the position and shape of the Mg-derived peak after Ar sputtering compared with the position and shape of the peak before Ar sputtering.

The electrochemical device of the present technology can be particularly used as a magnesium secondary battery as described with reference to FIGS. 1 to 3, and some application examples of such a magnesium secondary battery will be described in more detail. The configurations of application examples described below are only an example, and the configurations can be changed appropriately.

The magnesium secondary battery can be used in the form of a battery pack. Such a battery pack is a simple battery pack (so-called soft pack) using a magnesium secondary battery, and is mounted on, for example, an electronic device represented by a smartphone. Alternatively or additionally, it may include an assembled battery composed of six magnesium secondary batteries connected in two parallels and three series. The connection form of the magnesium secondary battery may be in series, in parallel, or in a mixed type of both.

Figure 7:
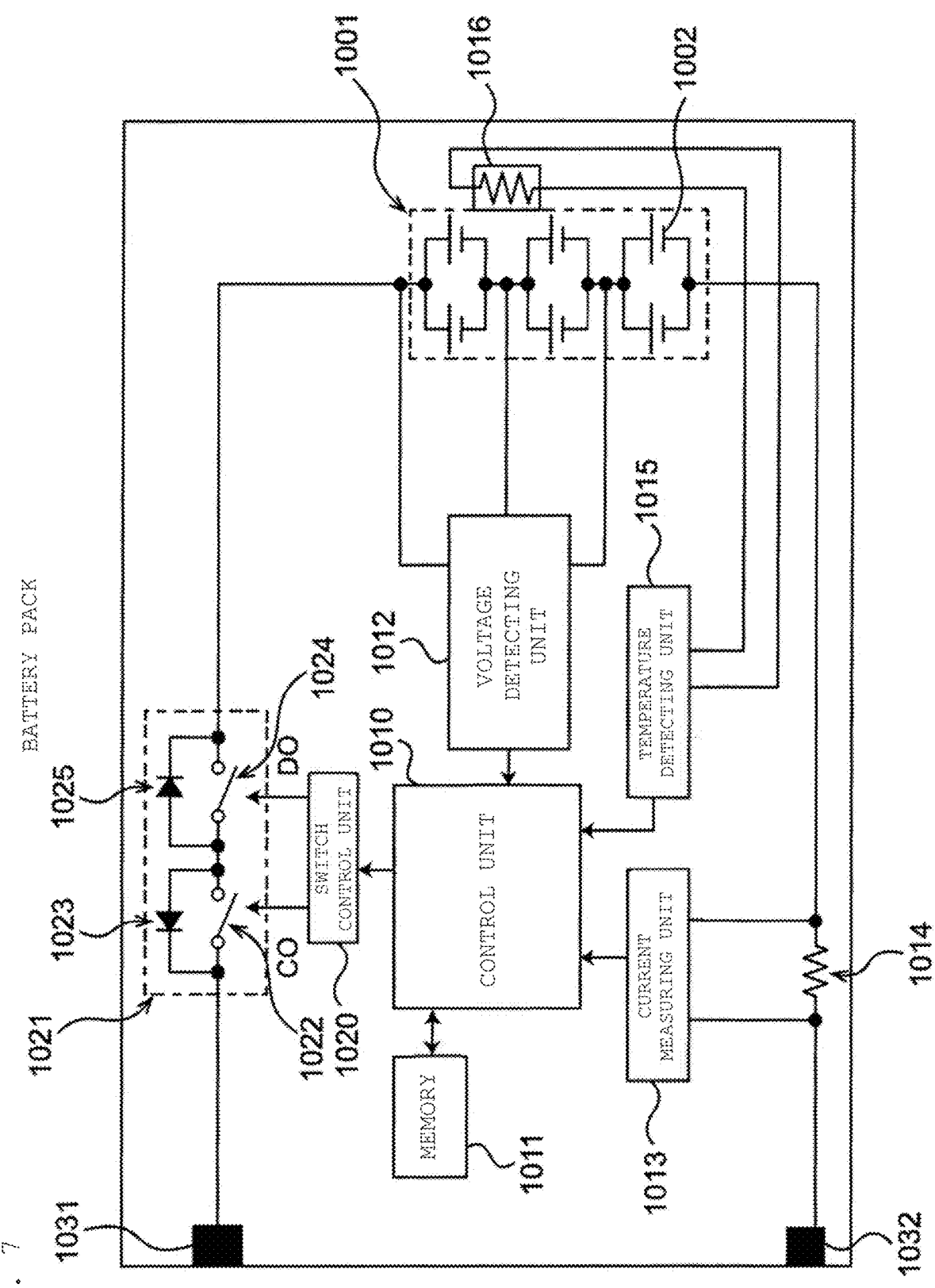
FIG. 7 is a block diagram showing a circuit configuration example in the case in which a magnesium secondary battery provided as an embodiment of the present technology is applied to a battery pack.

FIG. 7 shows a block diagram showing a circuit configuration example in the case in which the magnesium secondary battery of the present technology is applied to a battery pack. The battery pack includes a cell (e.g. an assembled battery) 1001, an exterior member, a switch unit 1021, a current detection resistor 1014, a temperature detection element 1016, and a control unit 1010. The switch unit 1021 includes a charge control switch 1022 and a discharge control switch 1024. The battery pack includes a positive electrode terminal 1031 and a negative electrode terminal 1032, and in charging, the positive electrode terminal 1031 and the negative electrode terminal 1032 are connected to the positive electrode terminal and the negative electrode terminal of a charger, respectively, to perform charging. When an electronic device is used, the positive electrode terminal 1031 and the negative electrode terminal 1032 are connected to the positive electrode terminal and the negative electrode terminal of the electronic device, respectively, to perform discharging.

The cell 1001 is configured in which a plurality of magnesium secondary batteries 1002 according to the present disclosure is connected in series and/or in parallel. Note that FIG. 7 shows the case in which six magnesium secondary batteries 1002 are connected in two parallels and three series (2P3S), and however, in addition to this, any connection method may be used like p parallel q series (however, p and q are integers).

The switch unit 1021 includes a charge control switch 1022 and a diode 1023, and a discharge control switch 1024 and a diode 1025, and is controlled by the control unit 1010. The diode 1023 has a reverse polarity to the charging current flowing from the positive electrode terminal 1031 to the cell 1001 and a forward polarity to the discharging current flowing from the negative electrode terminal 1032 to the cell 1001. The diode 1025 has polarities in the forward direction with respect to the charge current and in the reverse direction with respect to the discharge current. In the example, the switch unit is provided on the plus (+) side, and may be provided on the minus (−) side. The charge control switch 1022 is closed when the battery voltage reaches the overcharge detection voltage, and is controlled by the control unit 1010 such that the charge current does not flow in the current passage of the cell 1001. After the charge control switch 1022 is closed, only discharge is possible through the diode 1023. The charge control switch 1022 is closed when a large current flows in charging, and controlled by the control unit 1010 such that the charging current flowing in the current passage of the cell 1001 is cut off. The discharge control switch 1024 is closed when the battery voltage reaches the overcharge detection voltage, and is controlled by the control unit 1010 such that the charge current does not flow in the current passage of the cell 1001. After the discharge control switch 1024 is closed, only charging is possible through the diode 1025. The discharge control switch 1024 is closed when a large current flows in discharging, and controlled by the control unit 1010 such that the current flowing in the current passage of the cell 1001 is cut off.

The temperature detection element 1016 is composed of, for example, a thermistor and is provided in the vicinity of the cell 1001, and the temperature measurement unit 1015 measures the temperature of the cell 1001 using the temperature detection element 1016 and sends the measurement result to the control unit 1010. The voltage measurement unit 1012 measures the voltage of the cell 1001 and the voltage of each magnesium secondary battery 1002 constituting the cell 1001, converts the measurement result into analog to digital values, and sends the measurement result to the control unit 1010. The current measurement unit 1013 measures the current using the current detection resistor 1014, and sends the measurement result to the control unit 1010.

The switch control unit 1020 controls the charge control switch 1022 and the discharge control switch 1024 of the switch unit 1021 based on the voltage and the current sent from the voltage measurement unit 1012 and the current measurement unit 1013. The switch control unit 1020 prevents overcharging and overdischarging, and overcurrent charging and discharging by sending a control signal to the switch unit 1021 when the voltage of any of the magnesium secondary batteries 1002 reaches an overcharge detection voltage or overdischarge detection voltage or less, and/or when a large current suddenly flows. The charge control switch 1022 and the discharge control switch 1024 can be composed of a semiconductor switch such as a MOSFET. In this case, the diodes 1023 and 1025 are configured by the parasitic diodes of the MOSFET. In the case in which a p-channel FET is used as the MOSFET, the switch control unit 1020 respectively supplies a control signal DO and a control signal CO to the gate units of the charge control switch 1022 and the discharge control switch 1024. The charge control switch 1022 and the discharge control switch 1024 are conducted by a gate potential lower than the source potential by a predetermined value or more. That is, in normal charging and discharging operations, the control signal CO and the control signal DO are set to a low level, and the charge control switch 1022 and the discharge control switch 1024 are set to a conductive state. For example, in the case of overcharging or overdischarging, the control signal CO and the control signal DO are set to a high level, and the charge control switch 1022 and the discharge control switch 1024 are closed.

A memory 1011 is composed of, for example, an EPROM (Erasable Programmable Read Only Memory) and the like which is a non-volatile memory. The memory 1011 stores in advance numerical values calculated by the control unit 1010 and/or the internal resistance values of the magnesium secondary batteries 1002 in the initial state of each magnesium secondary measured at the stage of the manufacturing process, and the values can be rewritten appropriately. Storing the fully charged capacity of the magnesium secondary battery 1002 allows the calculation of the remaining capacity, for example, can be calculated together with the control unit 1010.

The temperature measuring unit 1015 measures temperatures using the temperature detection element 1016, performs charging and discharging control when abnormal heat generation occurs, and corrects the calculation of the remaining capacity.

Figure 8A:
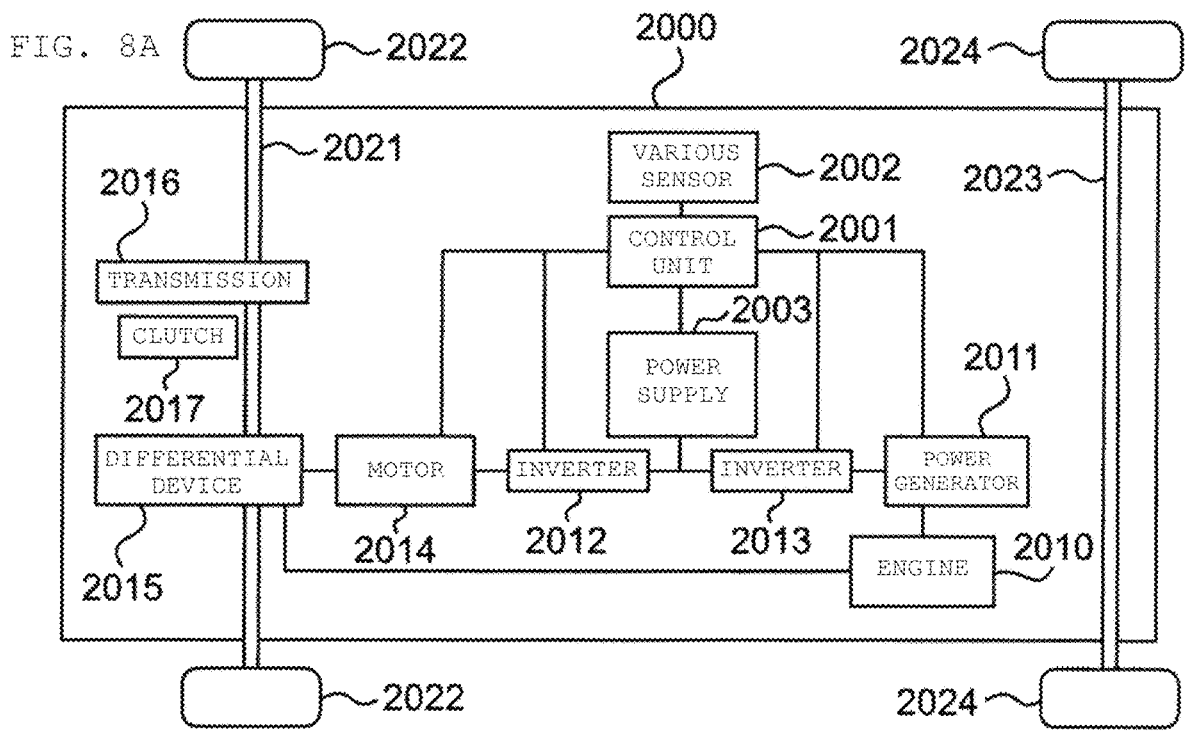
FIGS. 8A, 8B, and 8C are block diagrams showing the configurations of an electric vehicle, a power storage system, and a power tool to which a magnesium secondary battery is applied as an embodiment of the present technology.

Next, the application of the magnesium secondary battery to an electric vehicle will be described. FIG. 8A shows a block diagram showing the configuration of an electric vehicle such as a hybrid vehicle, which is an example of an electric vehicle. For example, an electric vehicle includes a control unit 2001, various sensors 2002, a power supply 2003, an engine 2010, a generator 2011, inverters 2012, and 2013, a drive motor 2014, a differential device 2015, a transmission 2016, and a clutch 2017 in the inside of a metal housing 2000. In addition, the electric vehicle includes, for example, a front wheel drive shaft 2021, front wheels 2022, a rear wheel drive shaft 2023, and rear wheels 2024 connected to the differential device 2015 and/or the transmission 2016.

The electric vehicle can run using any one of the engine 2010 or the motor 2014, for example, as a drive source. The engine 2010 is a major power source such as a gasoline engine. In the case in which the engine 2010 is used as a power supply, the driving force (e.g. rotational force) of the engine 2010 is transmitted to the front wheels 2022 or the rear wheels 2024 with the differential device 2015, transmission 2016, and the clutch 2017 interposed therebetween, for example, which are drive units (driver). The rotational force of the engine 2010 is also transmitted to the generator 2011, and the generator 2011 uses the rotational force to generate AC power, and the AC power is converted into DC power using the inverter 2013, and stored in the power supply 2003. On the other hand, in the case in which the motor 2014, which is a conversion unit (converter), is used as the power supply the electric power (e.g. DC power) supplied from the power supply 2003 is converted into AC power using the inverter 2012, and the motor 2014 is driven with the AC power. The driving force (e.g. rotational force) converted from the electric power by the motor 2014 is transmitted to the front wheels 2022 or the rear wheels 2024 with the differential device 2015, transmission 2016, and the clutch 2017 interposed therebetween, for example, which are drive units.

When the electric vehicle decelerates with the braking mechanism (not shown), the resistance force in deceleration is transmitted to the motor 2014 as a rotational force, and the motor 2014 may use the rotational force. AC power is converted into DC power using the inverter 2012, and DC regenerative power is stored in the power supply 2003.

The control unit (controller) 2001 controls the operation of the entire electric vehicle, and includes, for example, a CPU, a processor and/or the like. The power supply 2003 can include one or more magnesium secondary batteries (not shown) according to the present technology. The power supply 2003 can also be configured to store power by being connected to an external power source and receiving power supply from the external power source. The various sensors 2002 are used, for example, to control the rotation speed of the engine 2010 and to control the opening degree (throttle opening degree) of a throttle valve (not shown). The various sensors 2002 include, for example, a speed sensor, an acceleration sensor, and/or an engine speed sensor, and the like.

Although the case in which the electric vehicle is a hybrid vehicle has been described, the electric vehicle may be a vehicle (e.g. an electric vehicle) that operates using only the power supply 2003 and the motor 2014 without using the engine 2010.

Figure 8B:
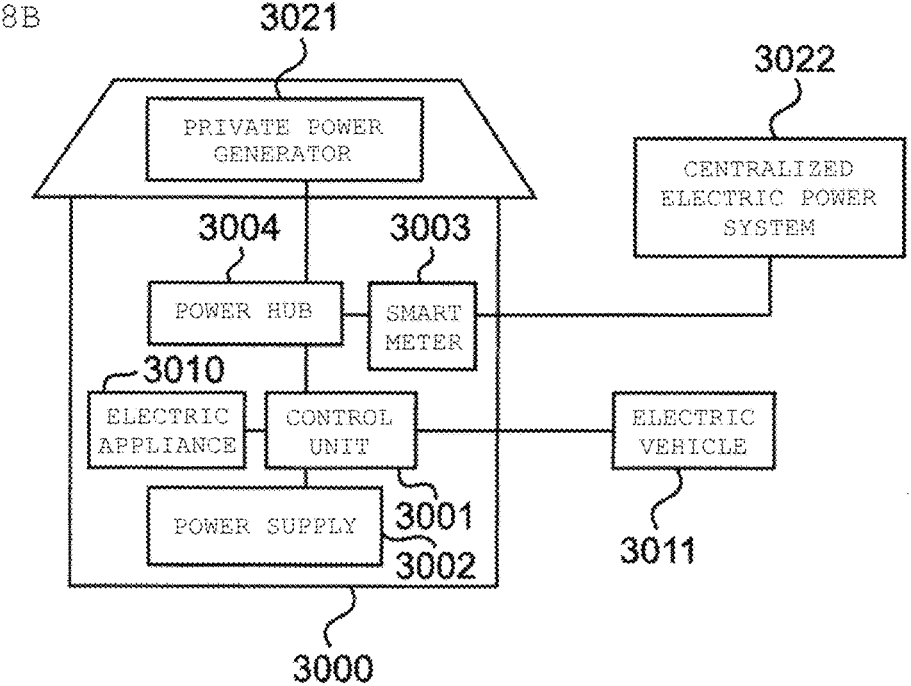

Next, the application of the magnesium secondary battery to a power storage system (e.g. a power supply system) will be described. A block diagram showing the configuration of a power storage system (e.g. a power supply system) is shown in FIG. 8B. The power storage system includes, for example, a control unit 3001, a power supply 3002, a smart meter 3003, and a power hub 3004 in the inside of a house 3000 such as a general house and a commercial building.

The power supply 3002 can be connected to, for example, an electric device (e.g. an electronic device) 3010 installed in the inside of the house 3000, and can be connected to an electric vehicle 3011 parked outside the house 3000. The power supply 3002 is connected to, for example, a private power generator 3021 installed in the house 3000 with the power hub 3004 interposed therebetween, and can be connected to an external centralized power system 3022 with the smart meter 3003 and the power hub 3004 interposed therebetween. The electrical device (e.g. electronic device) 3010 includes, for example, one or more home appliances. Examples of home appliances include refrigerators, air conditioners, television receivers, and/or water heaters. The private power generator 3021 is composed of, for example, a solar power generator and/or a wind power generator. Examples of the electric vehicle 3011 include an electric vehicle, a hybrid vehicle, an electric motorcycle, an electric bicycle, and/or a Segway (registered trademark). Examples of the centralized power systems 3022 can include commercial power supplies, power generators, power grids, and/or smart grids (e.g. next-generation power grids) and, for example, thermal power plants, nuclear power plants, hydropower plants, and/or wind power plants, and examples of power generation devices provided in the centralized power system 3022 include various solar cells, fuel cells, wind power generation devices, and/or micro-hydraulic power generation devices, geothermal power generation devices, and the like can be exemplified, but the present technology is not limited to these.

The control unit 3001 (controller) controls the operation of the entire power storage system (including the usage state of the power supply 3002), and includes, for example, a CPU, a processor and/or the like. The power supply 3002 can include one or more magnesium secondary batteries (not shown) according to the present technology. The smart meter 3003 is, for example, a network-compatible wattmeter installed in the house 3000 on the power demand side, and can communicate with the power supply side. For example, the smart meter 3003 enables efficient and stable energy supply by controlling the balance between supply and demand in the house 3000 while communicating with the outside.

In such a power storage system, for example, power is stored in the power supply 3002 from the centralized power system 3022 which is an external power supply through the smart meter 3003 and the power hub 3004, and from the private power generator 3021 which is an independent power supply, power is stored in the power supply 3002 through the power hub 3004. The electric power stored in the power supply 3002 is supplied to the electric device (e.g. electronic device) 3010 and the electric vehicle 3011 in response to the instruction of the control unit 3001, and thus the electric device (e.g. electronic device) 3010 can be operated, and the electric vehicle 3011 becomes rechargeable. That is, the electric power storage system is a system that enables the storage and supply of electric power in the house 3000 using the power supply 3002.

The power stored in the power supply 3002 can be used arbitrarily. Therefore, for example, it is possible to store power from the centralized power system 3022 to the power supply 3002 at midnight when the electricity charge is low, and use the power stored in the power supply 3002 during the daytime when the electricity charge is high.

The power storage system described above may be installed in each household (e.g. one household) or in each of a plurality of households (e.g. multiple households).

Figure 8C:
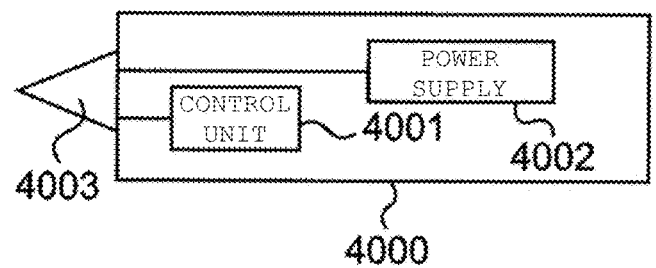

Next, the application of the magnesium secondary battery to a power tool will be described. A block diagram showing the configuration of a power tool is shown in FIG. 8C. The power tool is, for example, an electric drill, and includes a control unit 4001 and a power supply 4002 in the inside of a tool body 4000 made of a plastic material or the like. For example, a drill unit 4003, which is a movable portion, is rotatably attached to the tool body 4000. The control unit 4001 controls the operation of the entire power tool (including the usage state of the power supply 4002), and includes, for example, a CPU and the like. The power supply 4002 can include one or more magnesium secondary batteries (not shown) according to the present technology. The control unit 4001 supplies electric power from the power supply 4002 to the drill unit 4003 in response to the operation of an operation switch (not shown).

Although the embodiments of the present technology have been described above, the embodiments are merely typical examples. Therefore, those skilled in the art will easily understand that the present technology is not limited to these, and various forms can be considered without changing the gist of the present technology.

For example, the composition of the electrolytic solution, the raw materials used for production, the production method, the production conditions, the characteristics of the electrolytic solution, the electrochemical device, and the configuration or structure of the battery described above are examples, and the present technology is not limited to these, which can be changed appropriately. The electrolytic solution of the present technology can also be mixed with an organic polymer (e.g. polyethylene oxide, polyacrylonitrile and/or polyvinylidene fluoride (PVdF)) and used as a gel electrolyte.

EXAMPLES

The following verification test was conducted to confirm the effect of the present technology.
[Cyclic Voltammetry Evaluation]
Cyclic voltammetry evaluation was performed under the conditions shown below to confirm the precipitation and dissolution characteristics of magnesium.
Working electrode: Pt electrode ($\varphi$1.6 mm)
Reference electrode: Mg rod (($\varphi$1.6 mm)
Counter electrode: Mg rod ($\varphi$1.6 mm)
Scanning potential: −0.7 V to +1.5 V vs. Mg
Sweep speed: 25 mmV/s
Temperature: 25° C.

Example 1 (Addition of Magnesium Salt Having a Disilazide Structure)

Linear ether solvent: dimethoxyethane/DME (ethylene glycol dimethyl ether)
Magnesium salt: "first magnesium salt having a disilazide structure expressed by the general formula $(R_3Si)_2N$" and "second magnesium salt having no disiradide structure"
First magnesium salt: $Mg(HMDS)_2$, 0.29 M
Second magnesium chloride salt: halogen metal salt ($MgCl_2$ (anhydride), 1.14 M) and imide metal salt ($Mg(TFSI)_2$, 0.57 M)
$MgCl_2:Mg(TFSI)_2:Mg(HMDS)_2=2:1:0.5$ Comparative Example 1 (Without Addition of Magnesium Salt Having a Disilazide Structure)

Figure 9A:
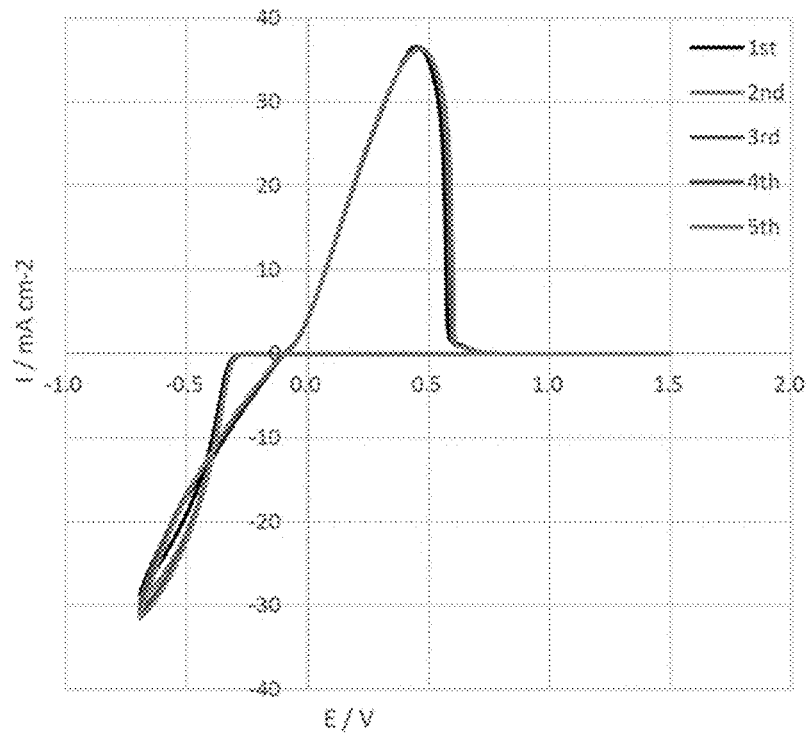
FIGS. 9A and 9B show the results of "cyclic voltammetry evaluation" in Example of the present specification according to an embodiment of the present technology.
Figure 9B:
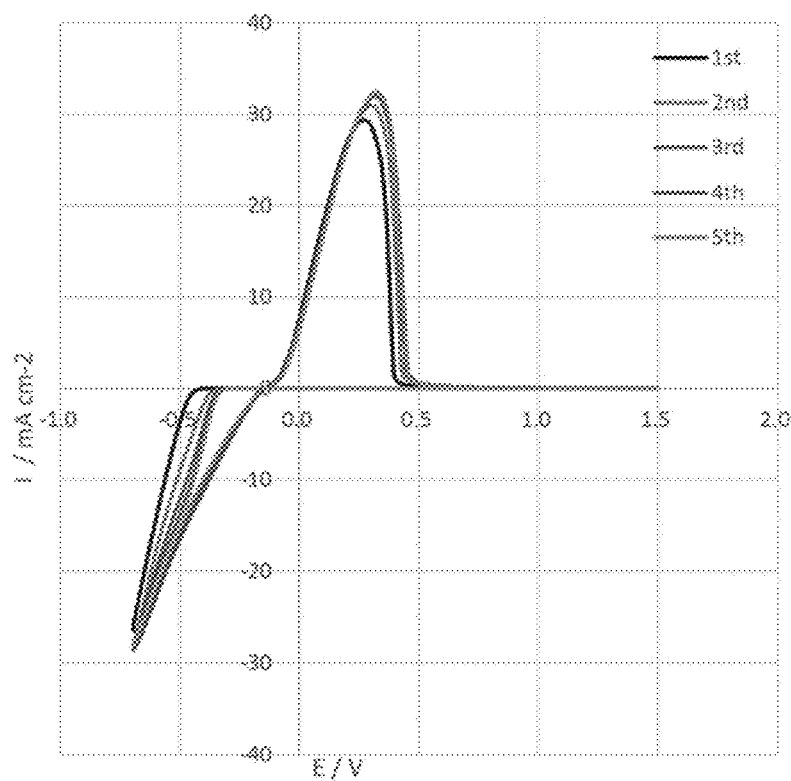

Linear ether solvent: dimethoxyethane/DME (ethylene glycol dimethyl ether)
Magnesium salt: halogen metal salt (MgCl (anhydride), 1.33 M) and imide metal salt ($Mg(TFSI)_2$, 0.67 M)
$MgCl_2:Mg(TFSI)_2:Mg(HMD)_2=2:1:0$
The results are shown in FIG. 9. FIG. 9(A) shows the result of the cyclic voltammetry evaluation of Example 1, while FIG. 9(B) shows the result of the cyclic voltammetry evaluation of Comparative Example 1, Comparing FIG. 9(A) and FIG. 9(B), it was found that in Example 1 according to the present technology, the current value (particularly the peak current) in Mg dissolution tends to be large, and more sufficient battery characteristics are exhibited.

The relationship between the addition ratio of $Mg(HMDS)_2$ and the Coulomb efficiency of Mg precipitation dissolution was investigated. Coulomb efficiency was measured by performing as follows. First, the coulomb efficiency was evaluated as follows. Cyclic voltammetry was measured as shown in FIG. 9, and a value that the current value in the range where the current value shows a negative value (−0.3V→−0.7V→−0.1V in FIG. 9(A)) is time-integrated is Qc, and a value that the current value in the range where the current value shows a positive value (−0.1V→+0.7V in FIG. 9(A)) is time-integrated is Qa. In the case of such Qc and Qa, the coulomb efficiency=(Qa/Qc)× 100 was defined.

Figure 10A:
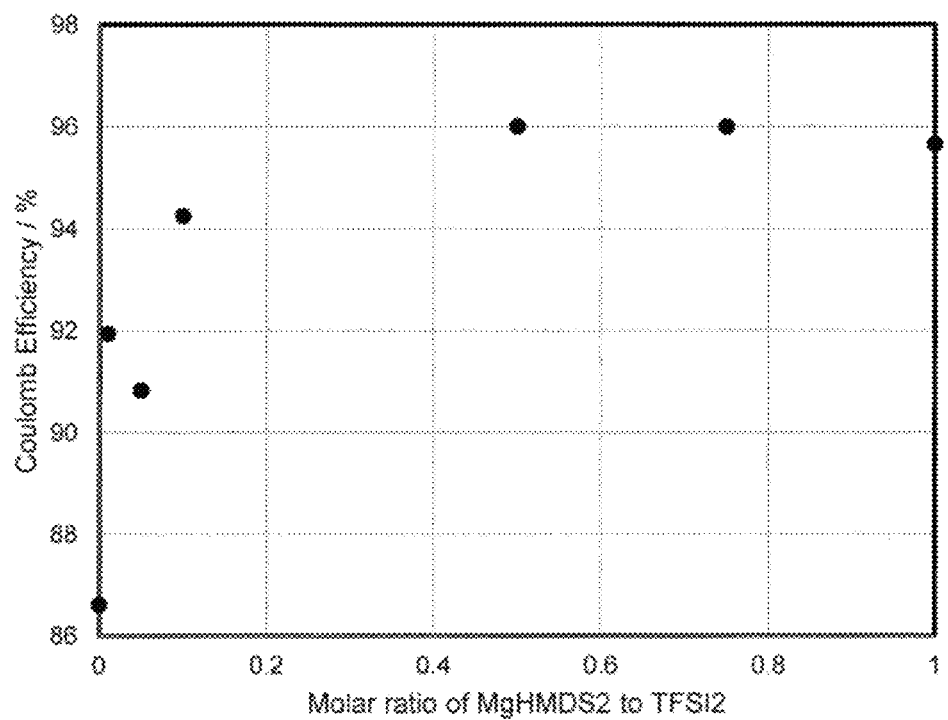
FIGS. 10A and 10B show the results of "evaluation of coulomb efficiency" in Example of the present specification according to an embodiment of the present technology.
Figure 10B:
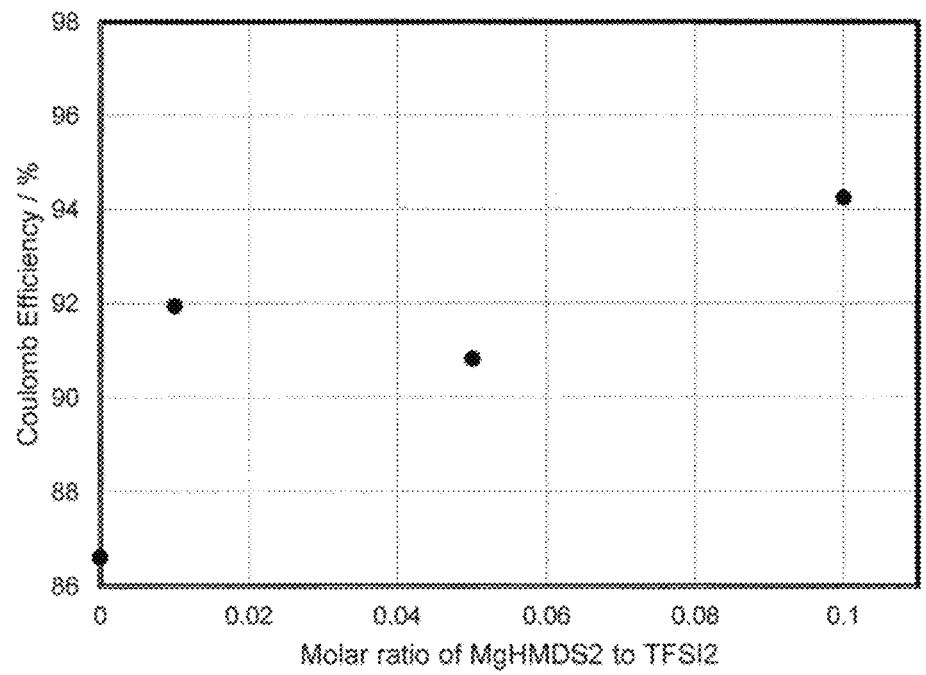

The total Mg concentration of the electrolytic solution was adjusted to 2 M, and the molar ratio of $MgCl_2$ to $Mg(TFSI)_2$ was fixed at 2:1. The results are shown in FIGS. 10(a) and 10(b). The horizontal axes of FIGS. 10(a) and 10(b) show the molar ratio of added $Mg(HMDS)_2$ to $Mg(TFSI)_2$. For example, in the case of "1.14M $MgCl_2$+ 0.57M $Mg(TFSI)_2$+0.29M $Mg(HMSD)_2$/DME electrolytic solution" in FIG. 9(A), the value on the horizontal axis of the graph in FIG. 10 corresponds to 0.5. FIG. 10(a) shows the above-described molar ratio in the range of 0 to 0.8, and FIG. 10(b) shows the range in which the molar ratio is 0 to 0.1 by locally expanding the range.

As can be seen from the graphs of FIGS. 10(a) and 10(b), it was found that the coulomb efficiency was increased only by adding 0.01 equivalent of $Mg(HMDS)_2$ to $Mg(TFSI)_2$. That is, it was found that the coulomb efficiency is improved by adding a small amount of "a magnesium salt having a disilazide structure" to a linear ether solvent containing "a magnesium salt having no dicyrazide structure". Regarding the specific improvement of the coulomb efficiency, it was found that the coulomb efficiency can be increased by at least about 4% to 10% by adding such a "magnesium salt having a disilazide structure".

The morphology of the precipitated Mg was observed. Specifically, the electrolytic solution of Example 1 (with the addition of a magnesium salt having a disilazide structure) was precipitated on Cu, and the morphology of the precipitated Mg was taken as an SEM image. Precipitation was carried out by immersing Li foil/Cu having a thickness of 20 μm in an electrolytic solution in which 0.89 M of $MgCl_2$, 0.44 M of $Mg(TFSI)_2$, and 0.66 M of $Mg(HMDS)_2$ were mixed with a DME solvent. A scanning electron microscope of JEOL model JSM-6700F was used to take SEM images.

The results are shown in FIG. 11. As can be seen from the SEM image shown in FIG. 11, it was found to have a geometric grain shape. That is, by adding the "magnesium salt having a disilazide structure" to the "magnesium salt having no disiradide structure", crystalline Mg was precipitated in the electrolytic solution. In other words, by thus adding the term "magnesium salt having a disilazide structure" to the term "magnesium salt having no disilazide structure", the precipitated Mg forms crystals, and it is presumed that such a precipitated Mg is pure Mg in closest packing.

A test was conducted to confirm the influence of the addition of the first magnesium salt having a disilazide structure on the cycle characteristics of the positive electrode.

The inclusion of the secondary magnesium salt (such as a halogen metal salt and/or the imide metal salt) in the linear ether solvent itself can improve the positive electrode cycle characteristics, but in this test, it was investigated how the cycle characteristics of the positive electrode are affected by the addition of more the first magnesium salt having a silazide structure.

Specifically, in a magnesium-sulfur secondary battery, it was investigated what kind of influence is affected to "the relationship between the number of charge and discharge cycles and the discharge capacity (unit: mAh/gram)" by "the first magnesium salt having a disilazide structure (Mg (HMDS)$_2$)", which is added to an electrolytic solution having the molar ratio of a halogen metal salt to an imide metal salt ($MgCl_2$:$Mg(TFSI)_2$) being 2:1, according to Example 1.

The specifications of the magnesium sulfur secondary battery are as follows.

Figure 12:
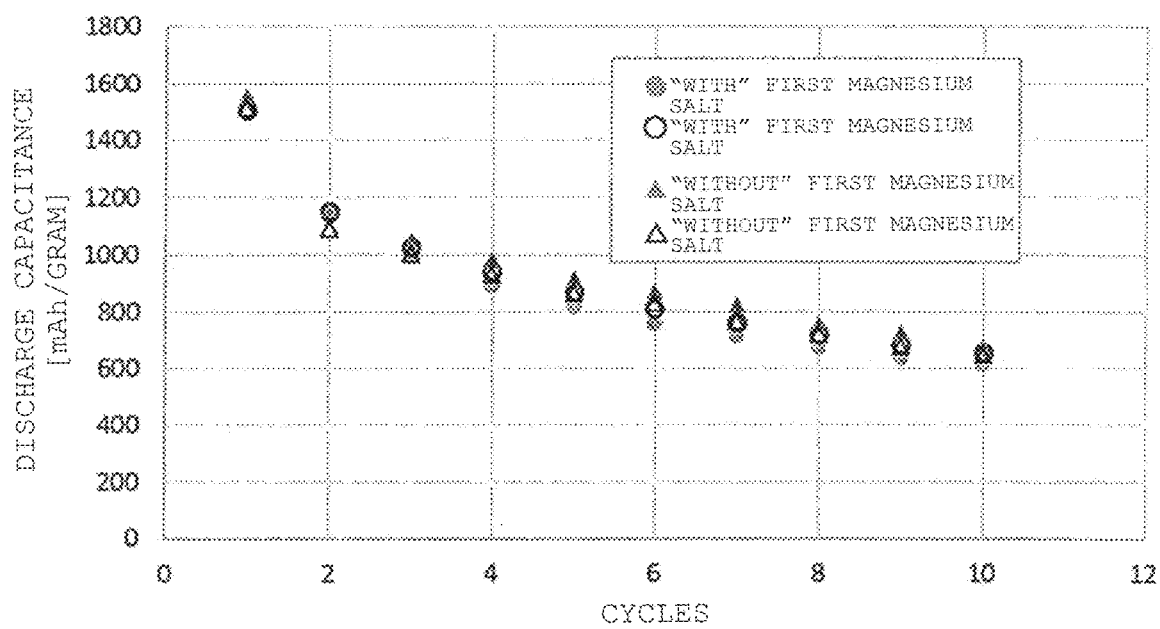
FIG. 12 is a graph showing the result of "positive electrode cycle characteristics" in Example of the present specification according to an embodiment of the present technology (particularly, a graph showing the relationship between the number of charge and discharge cycles and the discharge capacity).

Negative electrode: Magnesium electrode (Mg plate with φ15 mm and thickness of 200 μm/purity 99.9%)
Positive electrode: Sulfur electrode (electrode containing 10% by mass of Ss sulfur, containing Ketjen black (KB) as a conductive auxiliary agent, and containing polytetrafluoroethylene (PTFE) as a binder)
Separator: Fiberglass
Electrolytic solution
Linear ether solvent: dimethoxyethane/DME (ethylene glycol dimethyl ether)
Magnesium salt: halogen metal salt ($MgCl_2$ (anhydride), 2 M) and imide metal salt ($Mg(TFSI)_2$, 1 M)
Added "first magnesium salt having a disilazide structure": $Mg(HMDS)_2$, 0.1 M
Secondary battery form: Coin battery CR2016 type The results are shown in FIG. 12. As can be seen from the graph shown in FIG. 12, it was found that the cycle characteristics of the positive electrode were substantially independent of the presence or absence of the magnesium salt having a disilazide structure. That is, it was found that the magnesium salt having a disilazide structure in the electrolytic solution according to the present technology can contribute to the improvement of the coulomb efficiency of the negative electrode while suitably maintaining the cycle characteristics of the positive electrode.

Summarizing the above, the following items were enabled be found from this verification test.

The negative electrode coulomb efficiency is improved by adding "a magnesium salt having a disilazide structure expressed by the general formula $(R_3Si)_2N$" and a magnesium salt having no such structure to a linear ether solvent.

Since the "disilazid" magnesium salt had an aliphatic hydrocarbon group having one or more and ten or less carbon atoms, such a feature can contribute to the improvement of coulombic efficiency of the negative electrode.

Since the electrolytic solution contained a halogen metal salt and an imide metal salt, the use of at least two kinds of salts as the "non-disilazide" magnesium salt contained in the linear ether solvent can contribute to the improvement of coulombic efficiency of the negative electrode.

As for the halogen metal salt and the imide metal salt, since the halogen metal salt was magnesium chloride, the use of magnesium chloride as the "non-disilazide" magnesium salt can contribute to the improvement of coulombic efficiency of the negative electrode.

As for the halogen metal salt and the imide metal salt, since the imide metal salt was $Mg(TFSI)_2$, the use of the magnesium salt of perfluoroalkyl sulfonyl imide as the magnesium salt contained in the linear ether solvent can contribute to the improvement of negative electrode coulomb efficiency.

Since the "disilazid" magnesium salt had a lower alkyl group having one or more and ten or less carbon atoms, such a feature can contribute to the improvement of coulombic efficiency of the negative electrode.

Especially from the results of FIGS. 10(a) and 10(b), the molar ratio of the "disilazide" magnesium salt to the "non-disilazide" magnesium salt is 0.01 or more, and especially the molar ratio of the "disilazide" magnesium salt to the imide metal salt is 0.01 or more and 1 or less, which can contribute to the improvement of negative electrode coulomb efficiency.

Since the magnesium precipitated by charging and discharging had a geometric grain shape, such a feature can contribute to the improvement of coulombic efficiency of the negative electrode.

As can be said from the results in FIG. 12, the "disilazide" magnesium salt does not substantially adversely affect the cycle characteristics of the positive electrode, and thus contributes to the improvement of coulombic efficiency of the negative electrode while maintaining excellent cycle characteristics of the positive electrode.

The electrolytic solution of the present technology can be used in various fields for extracting energy by utilizing electrochemical reactions. Although only an example, the electrolytic solution of the present technology is used not only for secondary batteries but also for various electrochemical devices such as capacitors, air batteries and fuel cells.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrolytic solution for an electrochemical device including a magnesium electrode as a negative electrode, the electrolytic solution comprising:
a solvent including a linear ether,
wherein the solvent includes:
a first magnesium salt having a disilazide structure represented by a general formula $(R_3Si)_2N$, wherein R represents a hydrocarbon radical with one or more and ten or less carbon atoms, and
a second magnesium salt without the disilazide structure, wherein the second magnesium salt includes a halogen metal salt and an imide metal salt.

2. The electrolytic solution according to claim 1, wherein the R in the disilazide structure represents an aliphatic hydrocarbon group with one or more and ten or less carbon atoms.

3. The electrolytic solution according to claim 1, wherein the R in the disilazide structure represents a lower alkyl group with one or more and four or less carbon atoms.

4. The electrolytic solution according to claim 1, wherein the first magnesium salt includes magnesium bis(hexamethyldisilazide).

5. The electrolytic solution according to claim 1, wherein the halogen metal salt includes magnesium chloride.

6. The electrolytic solution according to according to claim 1, wherein the imide metal salt includes a magnesium salt of perfluoroalkyl sulfonyl imide.

7. The electrolytic solution according to according to claim 1, wherein the second magnesium salt includes magnesium chloride and magnesium bis(trifluoromethanesulfonyl) imide.

8. The electrolytic solution according to claim 1, wherein a molar ratio of the first magnesium salt to the second magnesium salt is 0.01 or more.

9. The electrolytic solution according to according to claim 2, wherein a molar ratio of the first magnesium salt to the imide metal salt is 0.01 or more.

10. The electrolytic solution according to claim 1,
wherein the linear ether is an ether represented by the chemical formula 1 below:

[Chemical Formula 1]

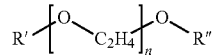

wherein, R' and R" each independently represent a hydrocarbon group having one or more and ten or less carbon atoms, and n is an integer from one to ten.

11. The electrolytic solution according to claim 10, wherein the R' and the R" independently represent a lower alkyl group with one or more and four or less carbon atoms.

12. The electrolytic solution according to claim 1, wherein a positive electrode of the electrochemical device includes a sulfur electrode including sulfur.

13. The electrochemical device including the negative electrode and a positive electrode, wherein
the negative electrode includes the magnesium electrode, and
the electrolytic solution according to claim 1.

14. The electrochemical device according to claim 13, wherein the positive electrode includes a sulfur electrode including sulfur.

15. The electrochemical device according to claim 13, wherein magnesium precipitated by charging and discharging has a geometrical grain shape.

16. The electrolytic solution according to claim 1, wherein a molar ratio of the first magnesium salt to the second magnesium salt is 1 or less.

* * * * *